United States Patent
Sakamoto et al.

(10) Patent No.: US 12,158,662 B2
(45) Date of Patent: Dec. 3, 2024

(54) BARRIER FILM FOR WAVELENGTH CONVERSION SHEET, WAVELENGTH CONVERSION SHEET, BACKLIGHT, AND LIQUID CRYSTAL DISPLAY DEVICE USING BARRIER FILM, AND METHOD FOR SELECTING BARRIER FILM FOR WAVELENGTH CONVERSION SHEET

(71) Applicant: DAI NIPPON PRINTING CO., LTD., Tokyo (JP)

(72) Inventors: Takeshi Sakamoto, Fujimino (JP); Shuichi Tamura, Misato (JP); Akihito Haruki, Saitama (JP); Ryutaro Harada, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 18/559,740

(22) PCT Filed: May 12, 2022

(86) PCT No.: PCT/JP2022/020005
§ 371 (c)(1),
(2) Date: Nov. 8, 2023

(87) PCT Pub. No.: WO2022/239819
PCT Pub. Date: Nov. 17, 2022

(65) Prior Publication Data
US 2024/0255804 A1    Aug. 1, 2024

(30) Foreign Application Priority Data

May 12, 2021 (JP) ................................. 2021-081211

(51) Int. Cl.
*G02F 1/13357* (2006.01)
*B32B 7/02* (2019.01)
(Continued)

(52) U.S. Cl.
CPC .......... *G02F 1/133617* (2013.01); *B32B 7/02* (2013.01); *B32B 27/08* (2013.01);
(Continued)

(58) Field of Classification Search
CPC ........................... G02F 1/133617; B32B 7/02
See application file for complete search history.

(56) References Cited

U.S. PATENT DOCUMENTS

| | | | |
|---|---|---|---|
| 2014/0030507 A1 | 1/2014 | Yoshida et al. |
| 2018/0194107 A1 | 7/2018 | Syoda |

(Continued)

FOREIGN PATENT DOCUMENTS

| | | |
|---|---|---|
| JP | 2015-18131 | 1/2015 |
| JP | 2018-109706 | 7/2018 |

(Continued)

OTHER PUBLICATIONS

International Search Report of PCT/JP2022/020005, Aug. 2, 2022, 5 pages with English translation.

(Continued)

*Primary Examiner* — Joseph L Williams
(74) *Attorney, Agent, or Firm* — HSML P.C.

(57) ABSTRACT

Provided is a barrier film for a wavelength conversion sheet that, when applied to a wavelength conversion sheet, can suppress in-plane uneven brightness of the wavelength conversion sheet. A barrier film for a wavelength conversion sheet, the barrier film including a first base material film, a second base material film, a barrier layer, a primer layer, and an adhesive layer positioned between the first base material film and the second base material film, wherein the barrier film satisfies the following condition 1: <Condition 1> A surface of the barrier film on a side having the primer layer with respect to the adhesive layer is defined as a surface 1; an elevation of the surface 1 is measured at intervals of 1 mm (Continued)

to obtain elevation data about the surface 1; a contour curve of the surface 1 determined by the elevation data is defined as a contour curve 1; at least a part of the surface 1 has at least one irregularity 1 having a height difference between an adjacent peak and valley of 0.001 mm or more and 0.600 mm or less in the contour curve 1 in a predetermined direction; when a height difference and a width of the irregularity 1 are defined as H [mm] and W [mm], respectively, the following expression (1): $H/W^2 \leq 1.5 \times 10^{-5}$ (1) is satisfied.

19 Claims, 4 Drawing Sheets

(51) Int. Cl.
*B32B 27/08* (2006.01)
*B32B 27/36* (2006.01)

(52) U.S. Cl.
CPC .......... *B32B 27/36* (2013.01); *B32B 2250/02* (2013.01); *B32B 2250/244* (2013.01); *B32B 2255/10* (2013.01); *B32B 2255/20* (2013.01); *B32B 2255/26* (2013.01); *B32B 2255/28* (2013.01); *B32B 2307/518* (2013.01); *B32B 2307/7376* (2023.05); *B32B 2457/202* (2013.01)

(56) References Cited

U.S. PATENT DOCUMENTS

| | | |
|---|---|---|
| 2019/0329528 A1 | 10/2019 | Murata et al. |
| 2021/0301097 A1 | 9/2021 | Murata et al. |

FOREIGN PATENT DOCUMENTS

| | | |
|---|---|---|
| JP | 2019-126924 | 8/2019 |
| JP | 2020-19141 | 2/2020 |
| JP | 2020-049836 | 4/2020 |
| JP | 2020-160212 | 10/2020 |
| WO | 2012/132239 | 10/2012 |
| WO | 2017/043483 | 3/2017 |

OTHER PUBLICATIONS

Written Opinion of PCT/JP2022/020005, Aug. 2, 2022, 10 pages with English translation.

[Fig. 1]
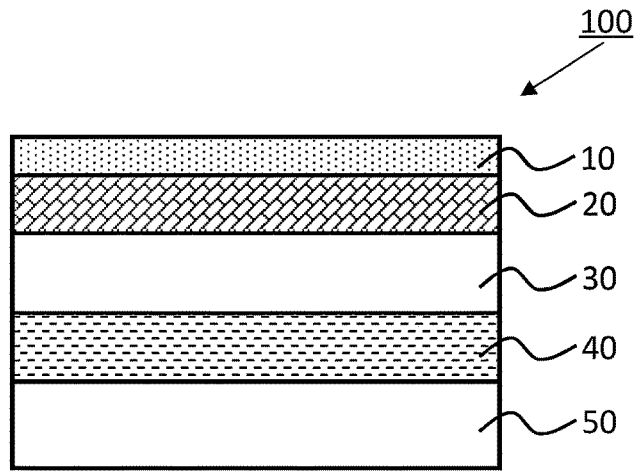
[Fig. 2]
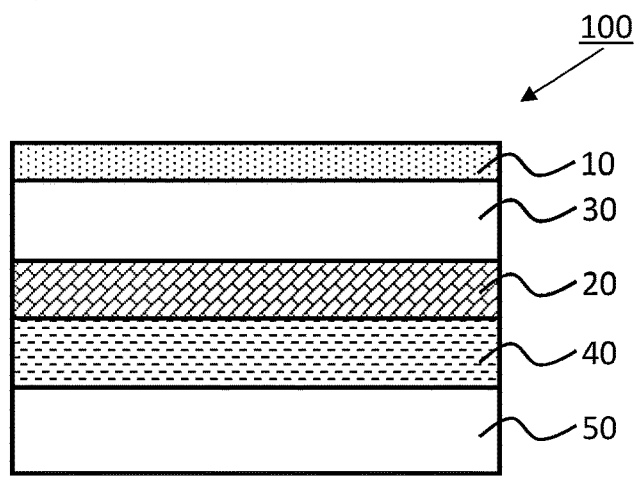
[Fig. 3]
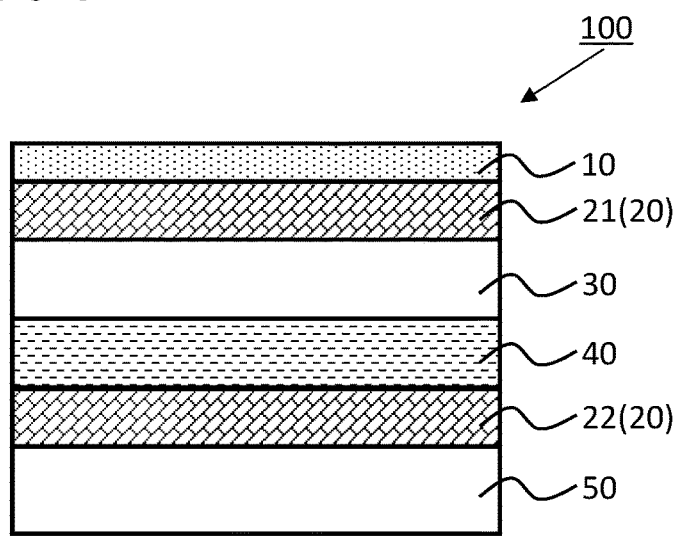

[Fig. 4]
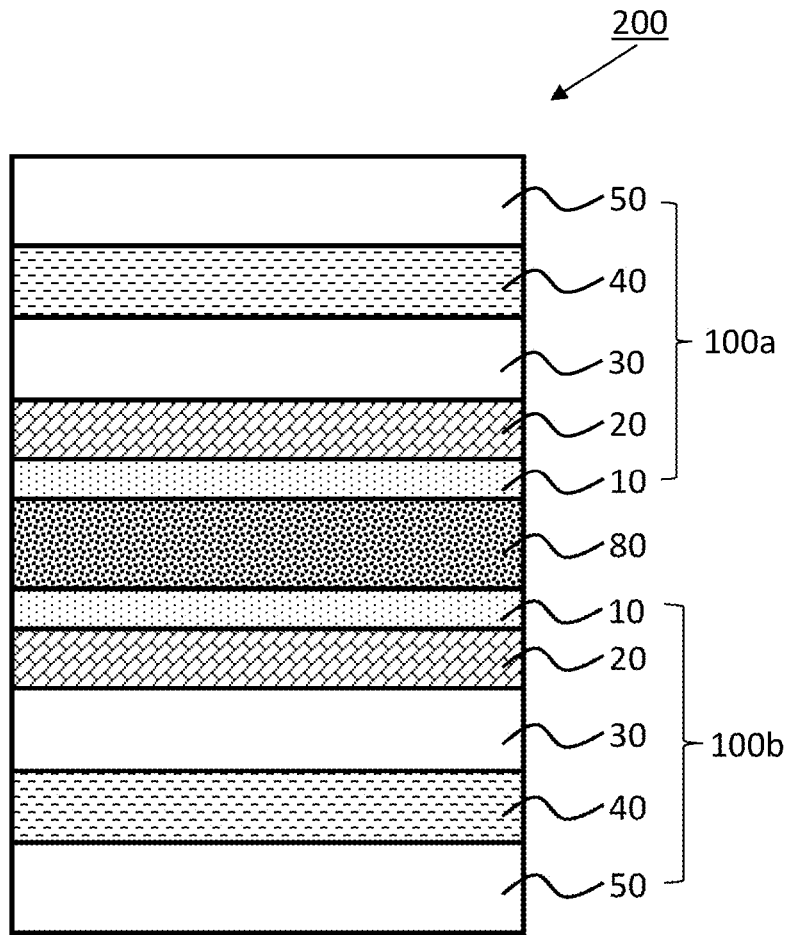
[Fig. 5]
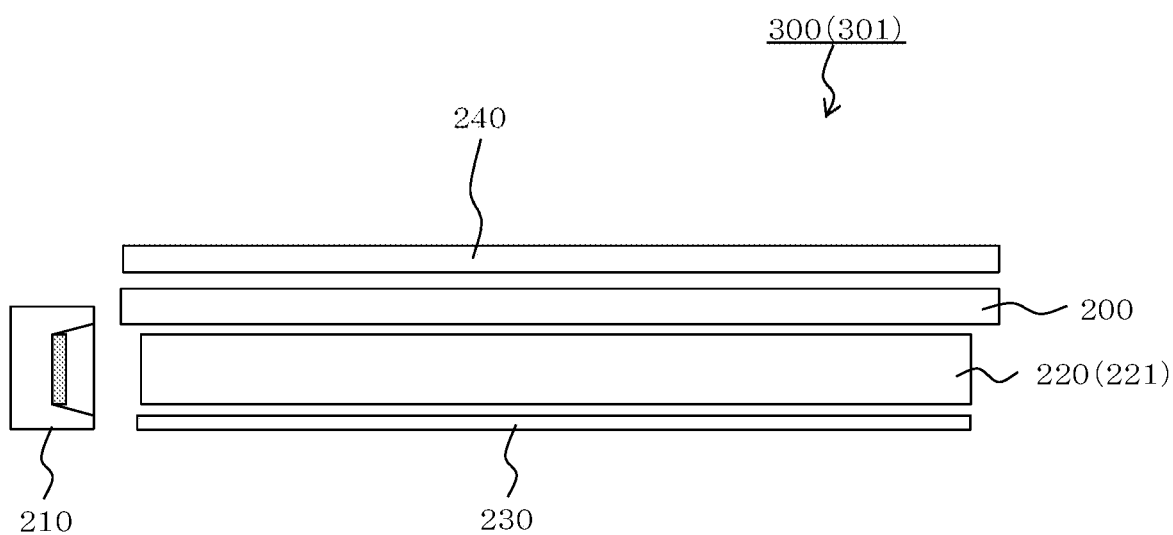

[Fig. 6]
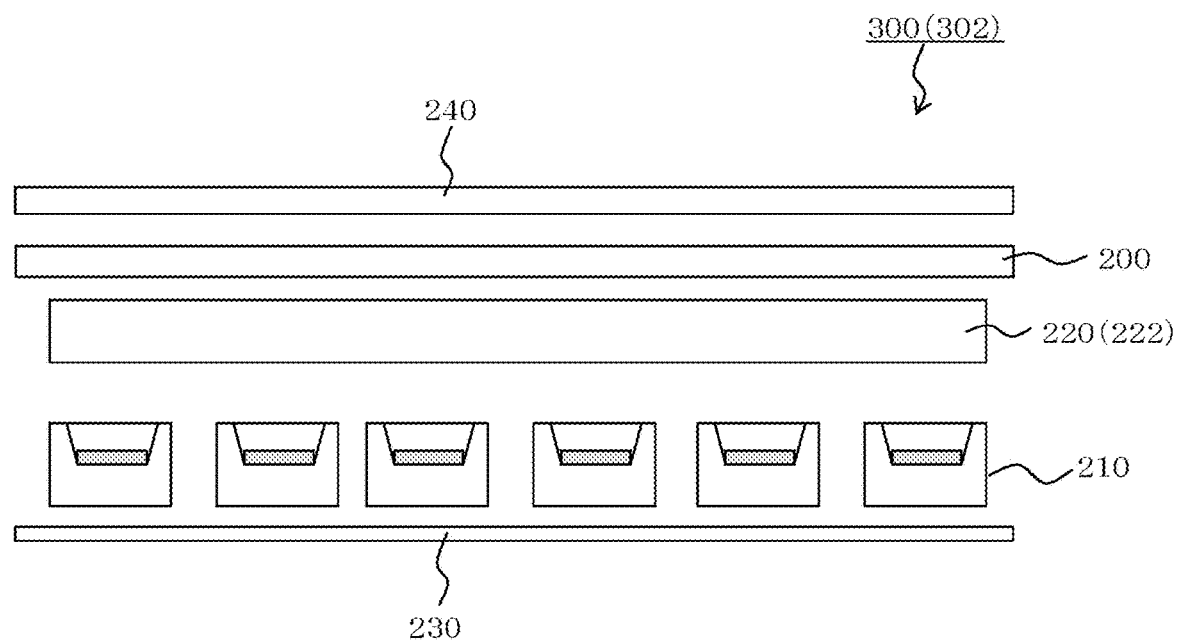
[Fig. 7]
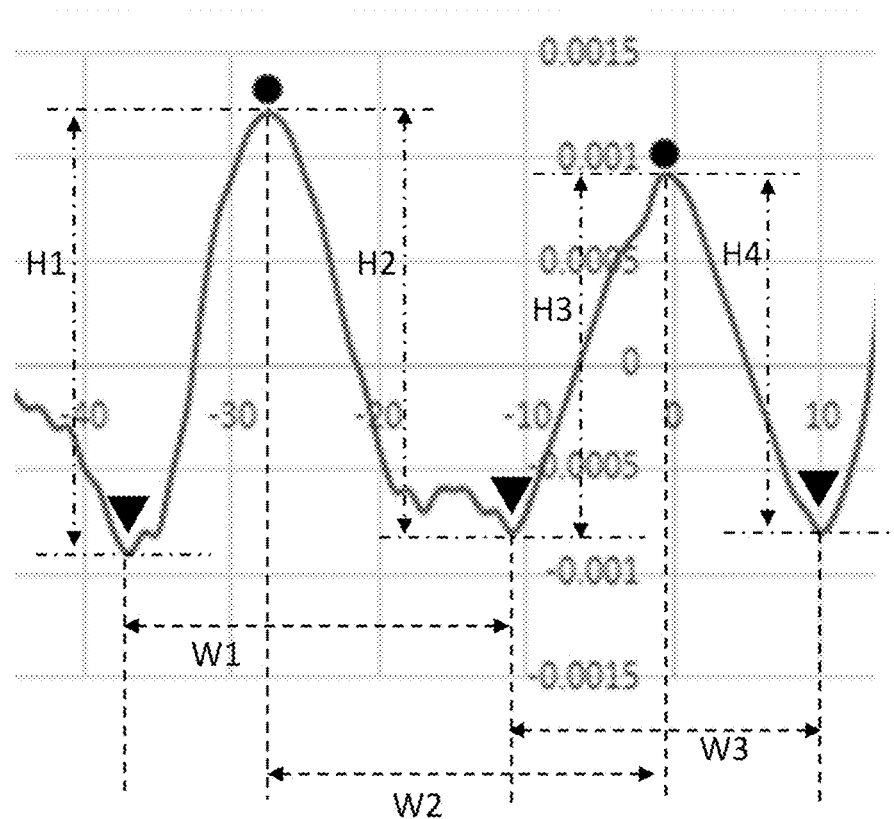

[Fig. 8]
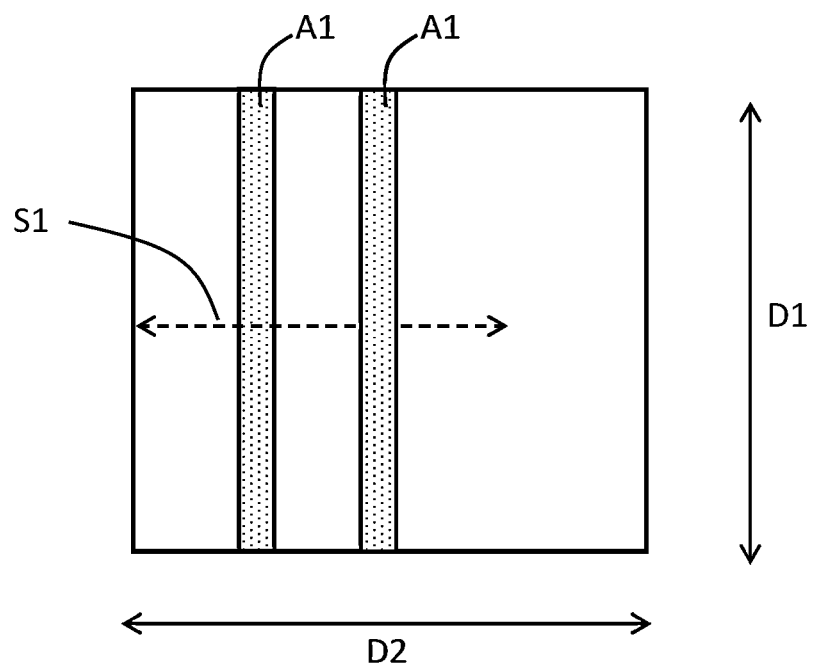

BARRIER FILM FOR WAVELENGTH CONVERSION SHEET, WAVELENGTH CONVERSION SHEET, BACKLIGHT, AND LIQUID CRYSTAL DISPLAY DEVICE USING BARRIER FILM, AND METHOD FOR SELECTING BARRIER FILM FOR WAVELENGTH CONVERSION SHEET

TECHNICAL FIELD

The present disclosure relates to a barrier film for a wavelength conversion sheet, a wavelength conversion sheet, a backlight, and a liquid crystal display apparatus using the barrier film, and a method for selecting a barrier film for a wavelength conversion sheet.

BACKGROUND ART

With the development of a personal computer such as a portable personal computer, the demand for a liquid crystal display apparatus has been increasing. In addition, recently, the penetration rate of a home-use liquid crystal display television has been increasing, and further, a smartphone and a tablet terminal have also been becoming widespread. Because of these, the present situation is that the market for a liquid crystal display apparatus is expanding further.

Such a liquid crystal display apparatus generally has a color filter, a liquid crystal cell, and a backlight. In the liquid crystal display apparatus, generally, the intensity of light is controlled by the shutter function of the liquid crystal layer in a liquid crystal cell, and the color of each pixel is displayed by dividing the color into the three primary colors of R, G, and B by the color filters. In this manner, the liquid crystal display apparatus displays an image.

Conventionally, a cold cathode tube has been used as a light source of the backlight of the liquid crystal display apparatus. However, to reduce power consumption and save space, the light source of the backlight has been switched from the cold cathode tube to an LED.

As the LED used as a light source of a normal backlight, what is called a white LED formed by combining a blue LED and a YAG-based yellow phosphor is used. Such a white LED has a broad spectral distribution of emission wavelength and is called pseudo-white.

On the other hand, in recent years, the development of a backlight using quantum dot technology has also been promoted. The quantum dot refers to a nanometer-sized fine particle of a semiconductor.

The basic configuration of a backlight using a quantum dot is a combination of a light source that generates primary light (such as a blue LED that emits blue light) and a quantum dot.

The quantum dot is, for example, a nano-sized compound semiconductor fine particle composed of a semiconductor fine particle composed of a core which is CdSe and a shell which is ZnS, and a ligand which covers the periphery of the shell. The particle size of the quantum dot is smaller than the Bohr radius of an exciton of the compound semiconductor, and thus the quantum confinement effect appears. Because of this, the quantum dot has a higher light emission efficiency than the conventionally used phosphor using a rare earth ion as an activator, and can realize a high light emission efficiency of 90% or more.

In addition, the emission wavelength of the quantum dot is determined by the bandgap energy of the compound semiconductor fine particle quantized as described above, and thus an arbitrary emission spectrum can be obtained by changing the particle size of the quantum dot. A backlight that combines such a quantum dot with a blue LED or the like can realize high light emission efficiency and high color purity (see, for example, Patent Literatures 1 and 2).

In addition, the quantum dot is also used for lighting, a quantum dot laser, or the like, in addition to a backlight for a liquid crystal display device.

While the quantum dot has the above excellent characteristics, a problem thereof is that the quantum dot is easily degraded by the influence of moisture, oxygen, or the like. Because of this, it is preferable to protect the surfaces of both sides of a quantum dot-containing layer with a barrier film.

Patent Literatures 3 and 4 propose a wavelength conversion sheet in which surfaces of both sides of a quantum dot-containing layer are protected by a barrier film comprising a base material, an inorganic oxide layer, and an organic coating layer.

CITATION LIST

Patent Literature

PTL1: WO 2012/132239
PTL2: JP 2015-18131 A
PTL3: JP 2019-126924 A
PTL4: JP 2020-19141 A

SUMMARY OF INVENTION

Technical Problem

However, in the wavelength conversion sheets to which the barrier films of Patent Literatures 3 and 4 have been applied, in-plane uneven brightness has been visually recognized in some cases.

A quantum dot is characterized by displaying a clear image by increasing the color purity of a liquid crystal display apparatus. Because of this, a problem is that when in-plane uneven brightness of the wavelength conversion sheet is visually recognized, a clear image, which is a characteristic of a quantum dot, is impaired.

In view of the above problem, it is an object of the present disclosure to provide a barrier film for a wavelength conversion sheet that, when applied to a wavelength conversion sheet, can suppress in-plane uneven brightness of the wavelength conversion sheet. In addition, it is another object of the present disclosure to provide a wavelength conversion sheet, a backlight, and a liquid crystal display apparatus using the barrier film. In addition, it is yet another object of the present disclosure to provide a method for selecting a barrier film for a wavelength conversion sheet that can suppress in-plane uneven brightness of a wavelength conversion sheet.

Solution to Problem

The present inventors have made intensive studies in order to solve the above problems, and found that when a surface of a barrier film for a wavelength conversion sheet satisfies a predetermined condition, in-plane uneven brightness of a wavelength conversion sheet or the like to which the barrier film has been applied can be suppressed.

The present disclosure provides the following [1] to [19].
[1] A barrier film for a wavelength conversion sheet, the barrier film comprising a first base material film, a second base material film, a barrier layer, a primer layer, and an adhesive layer positioned between the first base material film and the second base material film, wherein the barrier film satisfies the following condition 1:

<Condition 1>

A surface of the barrier film on a side having the primer layer with respect to the adhesive layer is defined as a surface 1; an elevation of the surface 1 is measured at intervals of 1 mm to obtain elevation data about the surface 1; a contour curve of the surface 1 determined by the elevation data is defined as a contour curve 1; at least a part of the surface 1 comprises at least one or more irregularity 1 having a height difference between an adjacent peak and valley of 0.001 mm or more and 0.600 mm or less in the contour curve 1 in a predetermined direction; when a height difference and a width of the irregularity 1 are defined as H [mm] and W [mm], respectively, the following expression (1):

$$H/W^2 \leq 1.5 \times 10^{-5} \tag{1}$$

is satisfied.

[2] The barrier film for a wavelength conversion sheet according to [1], wherein in the condition 1, $H/W^2$ in the expression (1) is $0.1 \times 10^{-5}$ or more and $1.5 \times 10^{-5}$ or less.

[3] The barrier film for a wavelength conversion sheet according to [1] or [2], wherein the barrier film comprises the second base material film, the adhesive layer, the first base material film, the barrier layer, and the primer layer in presented order.

[4] The barrier film for a wavelength conversion sheet according to [1] or [2], wherein the barrier film comprises the second base material film, the adhesive layer, the barrier layer, the first base material film, and the primer layer in presented order.

[5] The barrier film for a wavelength conversion sheet according to [3] or [4], wherein the barrier film comprises an anti-sticking layer on an opposite side of the second base material film from the adhesive layer.

[6] The barrier film for a wavelength conversion sheet according to any one of [1] to [5], wherein when a thickness of the first base material film and a thickness of the second base material film are defined as T1 and T2, respectively, T1<T2.

[7] The barrier film for a wavelength conversion sheet according to [6], wherein T2/T1 is 2.0 or more and 10.0 or less.

[8] The barrier film for a wavelength conversion sheet according to any one of [1] to [7], wherein when a thickness of the first base material film is defined as T1, T1 is 5 μm or more and 100 μm or less.

[9] The barrier film for a wavelength conversion sheet according to any one of [1] to [8], wherein when a thickness of the second base material film is defined as T2, T2 is 10 μm or more and 200 μm or less.

[10] The barrier film for a wavelength conversion sheet according to any one of [1] to [9], wherein the barrier layer comprises an inorganic oxide layer and an organic coating layer.

[11] The barrier film for a wavelength conversion sheet according to any one of [1] to [10], wherein the adhesive layer comprises a cured product of a composition for an adhesive layer comprising an isocyanate-based curing agent.

[12] The barrier film for a wavelength conversion sheet according to any one of [1] to [11], wherein a ratio of a total light transmittance of a region not having the irregularity 1 to a total light transmittance of a region having the irregularity 1 is 0.95 or more and 1.05 or less.

[13] A barrier film for a wavelength conversion sheet, the barrier film comprising a base material film, a barrier layer, and a primer layer in presented order, wherein the barrier film satisfies the following condition 1':

<Condition 1'>

A surface of the barrier film on a side having the primer layer with respect to the barrier layer is defined as a surface 1'; an elevation of the surface 1' is measured at intervals of 1 mm to obtain elevation data about the surface 1'; a contour curve of the surface 1' determined by the elevation data is defined as a contour curve 1'; at least a part of the surface 1' comprises at least one or more irregularity 1' having a height difference between an adjacent peak and valley of 0.001 mm or more and 0.600 mm or less in the contour curve 1' in a predetermined direction; when a height difference and a width of the irregularity 1' are defined as H [mm] and W [mm], respectively, the following expression (1'):

$$H/W^2 \leq 1.5 \times 10^{-5} \tag{1'}$$

is satisfied.

[14] A wavelength conversion sheet comprising a first barrier film, a quantum dot-containing layer comprising a quantum dot, and a second barrier film laminated in presented order, wherein as at least one barrier film of the first barrier film and the second barrier film, the barrier film for a wavelength conversion sheet according to any one of [1] to [13] is laminated such that a surface of a side of the primer layer thereof faces a side of the quantum dot-containing layer.

[15] The wavelength conversion sheet according to [14], wherein a thickness of the quantum dot-containing layer is 10 μm or more and 200 μm or less.

[16] A backlight comprising: at least one light source that emits primary light; an optical plate that is disposed adjacent to the light source and is for light guiding or diffusion; and a wavelength conversion sheet disposed on a light going-out side of the optical plate, wherein the wavelength conversion sheet is the wavelength conversion sheet according to [14] or [15].

[17] A liquid crystal display apparatus comprising: a backlight; and a liquid crystal panel, wherein the backlight is the backlight according to [16].

[18] A method for selecting a barrier film for a wavelength conversion sheet, the barrier film comprising a first base material film, a second base material film, a barrier layer, a primer layer, and an adhesive layer positioned between the first base material film and the second base material film, wherein a requirement for selecting is to satisfy the following condition 1:

<Condition 1>

A surface of the barrier film on a side having the primer layer with respect to the adhesive layer is defined as a surface 1; an elevation of the surface 1 is measured at intervals of 1 mm to obtain elevation data about the surface 1; a contour curve of the surface 1 determined by the elevation data is defined as a contour curve 1; at least a part of the surface 1 comprises at least one or more irregularity 1 having a height difference between an adjacent peak and valley of 0.001 mm or more and 0.600 mm or less in the contour curve 1 in a predetermined direction; when a height difference and a width of the irregularity 1 are defined as H [mm] and W [mm], respectively, the following expression (1):

$$H/W^2 \leq 1.5 \times 10^{-5} \quad (1)$$

is satisfied.

[19] A method for selecting a barrier film for a wavelength conversion sheet, the barrier film comprising a base material film, a barrier layer, and a primer layer in presented order, wherein
a requirement for selecting is to satisfy the following condition 1':
<Condition 1'>
A surface of the barrier film on a side having the primer layer with respect to the barrier layer is defined as a surface 1'; an elevation of the surface 1' is measured at intervals of 1 mm to obtain elevation data about the surface 1'; a contour curve of the surface 1' determined by the elevation data is defined as a contour curve 1'; at least a part of the surface 1' comprises at least one or more irregularity 1' having a height difference between an adjacent peak and valley of 0.001 mm or more and 0.600 mm or less in the contour curve 1' in a predetermined direction; when a height difference and a width of the irregularity 1' are defined as H [mm] and W [mm], respectively, the following expression (1'):

$$H/W^2 \leq 1.5 \times 10^{-5} \quad (1')$$

is satisfied.

Advantageous Effects of Invention

The barrier film for a wavelength conversion sheet, and the wavelength conversion sheet, the backlight, and the liquid crystal display apparatus using the barrier film according to the present disclosure can suppress in-plane uneven brightness. The method for selecting a barrier film for a wavelength conversion sheet according to the present disclosure can efficiently select a barrier film for a wavelength conversion sheet that can suppress in-plane uneven brightness.

BRIEF DESCRIPTION OF DRAWINGS

FIG. 1 is a cross-sectional view showing one embodiment of the barrier film according to the present disclosure.
FIG. 2 is a cross-sectional view showing another embodiment of the barrier film according to the present disclosure.
FIG. 3 is a cross-sectional view showing another embodiment of the barrier film according to the present disclosure.
FIG. 4 is a cross-sectional view showing one embodiment of the wavelength conversion sheet of the present disclosure.
FIG. 5 is a cross-sectional view showing one embodiment of the backlight of the present disclosure.
FIG. 6 is a cross-sectional view showing another embodiment of the backlight of the present disclosure.
FIG. 7 is a diagram illustrating a method for determining the height difference H of an irregularity 1 and the width W of the irregularity 1.
FIG. 8 is a diagram illustrating the position where $H/W^2$ was calculated in Table 1 of the Examples.

DESCRIPTION OF EMBODIMENTS

Hereinafter, embodiments of the present disclosure will be described.

Barrier Film for Wavelength Conversion Sheet According to First Embodiment

The barrier film for a wavelength conversion sheet according to a first embodiment of the present disclosure is a barrier film for a wavelength conversion sheet, comprising a first base material film, a second base material film, a barrier layer, a primer layer, and an adhesive layer positioned between the first base material film and the second base material film, wherein
the barrier film satisfies the following condition 1:
<Condition 1>
A surface of the barrier film on a side having the primer layer with respect to the barrier layer is defined as a surface 1; an elevation of the surface 1 is measured at intervals of 1 mm to obtain elevation data about the surface 1; a contour curve of the surface 1 determined by the elevation data is defined as a contour curve 1; at least a part of the surface 1 comprises at least one or more irregularity 1 having a height difference between an adjacent peak and valley of 0.001 mm or more and 0.600 mm or less in the contour curve 1 in a predetermined direction; when a height difference and a width of the irregularity 1 are defined as H [mm] and W [mm], respectively, the following expression (1):

$$H/W^2 \leq 1.5 \times 10^{-5} \quad (1)$$

is satisfied.

FIG. 1 to FIG. 3 are each a cross-sectional view showing an embodiment of a barrier film 100 for a wavelength conversion sheet according to the first embodiment of the present disclosure. The barrier films 100 for a wavelength conversion sheet shown in FIG. 1 to FIG. 3 have a first base material film 30, a second base material film 50, a barrier layer 20, a primer layer 10, and an adhesive layer 40 positioned between the first base material film and the second base material film. The barrier film 100 shown in FIG. 3 has, as the barrier layer 20, a first barrier layer 21 formed on the first base material film and a second barrier layer 22 formed on the second base material film.

In the barrier films 100 for a wavelength conversion sheet shown in FIG. 1 to FIG. 3, the upper surface shown in each figure corresponds to the surface 1 of condition 1 of the present disclosure.

As used herein, the "barrier film for a wavelength conversion sheet according to the present disclosure" and the "barrier film for a wavelength conversion sheet" may be referred to as the "barrier film of the present disclosure" and the "barrier film."

<Laminated Configuration>

Examples of the laminated configuration of the barrier film of the first embodiment of the present disclosure include the following (A1) to (A5). The laminated configurations of the barrier film of the first embodiment of the present disclosure are not limited to the following laminated configurations (A1) to (A5). When the barrier films having the following (A1) to (A5) further have an anti-sticking layer, these preferably have the anti-sticking layer on an opposite side of the second base material film from the side having the adhesive layer.

(A1) A laminated configuration having a second base material film, an adhesive layer, a first base material film, a barrier layer, and a primer layer in presented order.

(A2) A laminated configuration having a second base material film, an adhesive layer, a barrier layer, a first base material film, and a primer layer in presented order.

(A3) A laminated configuration having a second base material film, a barrier layer, an adhesive layer, a first base material film, and a primer layer in presented order.

(A4) A laminated configuration having a second base material film, a second barrier layer, an adhesive layer, a first base material film, a first barrier layer, and a primer layer in presented order.

(A5) A laminated configuration having a second base material film, a second barrier layer, an adhesive layer, a first barrier layer, a first base material film, and a primer layer in presented order.

The barrier film of the first embodiment of the present disclosure needs to satisfy the following condition 1. If the barrier film does not satisfy condition 1, it is not possible to suppress in-plane uneven brightness of the wavelength conversion sheet:

<Condition 1>

A surface of the barrier film on a side having the primer layer with respect to the adhesive layer is defined as a surface 1; an elevation of the surface 1 is measured at intervals of 1 mm to obtain elevation data about the surface 1; a contour curve of the surface 1 determined by the elevation data is defined as a contour curve 1; at least a part of the surface 1 comprises at least one or more irregularity 1 having a height difference between an adjacent peak and valley of 0.001 mm or more and 0.600 mm or less in the contour curve 1 in a predetermined direction; when a height difference and a width of the irregularity 1 are defined as H [mm] and W [mm], respectively, the following expression (1):

$$H/W^2 \leq 1.5 \times 10^{-5} \tag{1}$$

is satisfied.

Condition 1 stipulates that the surface 1, which is the surface of the barrier film on the side having the primer layer with respect to the adhesive layer, satisfies a predetermined condition. As shown in FIG. 4, when the barrier film is applied to a wavelength conversion sheet, a quantum dot-containing layer is positioned on the surface of the primer layer side of the barrier film. Because of this, it is considered that the surface of the primer layer side of the barrier film affects the performance of the quantum dot-containing layer. It is considered that, since the surface of the primer layer side of the barrier film satisfies condition 1, the barrier film of the present disclosure can give smaller influence when forming a quantum dot-containing layer on the barrier film, to thereby suppress in-plane uneven brightness of the wavelength conversion sheet. Hereinafter, condition 1 will be described more specifically.

Condition 1 is based on the premise that the surface 1, which is the surface of the barrier film on the side having the primer layer with respect to the adhesive layer, has a predetermined irregularity.

It is considered that the irregularity on the surface 1 is generated in a step of bonding the first base material film and the second base material film together via the adhesive layer and a heating step after the above step.

It is considered that a first reason why the irregularity is generated by the above steps is the tension in the flow direction applied to the base material films when the first base material film and the second base material film are bonded together via the adhesive layer. Specifically, it is considered that when the base material film is pulled with tension applied in the flow direction, a minute streak is generated in the flow direction, and this streak can act as a trigger for the irregularity. It is considered that a second reason why the irregularity is generated by the above steps is the shrinkage of a layer constituting the barrier film due to heating. Examples of a shrinkable layer include the adhesive layer, the barrier layer, the first base material film, and the second base material film, and among these, the adhesive layer tends to shrink more. The adhesive layer shrinks mainly when cured. Specifically, it is considered that the minute streak in the flow direction described above acts as a trigger, and that a peak and a valley are formed in the flow direction along the streak due to the shrinkage of the adhesive layer and the like. In particular, it is considered that when the composition for an adhesive layer includes a curing agent that reacts with moisture in the air, the invasion by moisture from an end portion of the barrier film easily forms a peak and a valley in the flow direction along the streak. In the barrier film wound into a roll, the surface side is more easily exposed to moisture than the core side, and thus a peak and a valley may be more easily formed on the surface side of the roll. In addition, in the barrier film wound into a roll, peaks and valleys formed at the same positions in the width direction tend to gradually pile up so that the peaks and valleys on the surface side of the roll become larger. It is considered that by the above phenomenon, peaks extending in the flow direction and valleys extending in the flow direction are formed in the barrier film, and that irregularities are thus formed in a contour curve of the barrier film in the width direction.

It is considered that the irregularity on the surface 1 is generated by a combined factor of the first reason and the second reason, and it is considered that the irregularity is unlikely to be generated by the first reason or the second reason alone.

A minute streak that causes an irregularity on the surface 1 can be suppressed by adjusting a mechanical condition such as tension when producing a barrier film, and thus the irregularity on the surface 1 can be suppressed. However, even if a mechanical condition such as tension is adjusted, it is difficult to completely eliminate the minute streak, and thus it is difficult to completely eliminate the irregularity on the surface 1. On the premise that an irregularity is generated on the surface 1 of a barrier film having a configuration in which a first base material film and a second base material film are bonded via an adhesive layer, the present inventors have studied the conditions for making the uneven brightness less noticeable and arrived at condition 1.

It is considered that the irregularity on the surface 1 is generated by the factor described above. Because of this, it is considered that the problem of the irregularity is unlikely to arise in a barrier film that does not have two base material films. However, even to a barrier film having one base material film, tension is applied during production of the barrier film, and thus an irregularity may be generated unless the tension is adjusted.

In condition 1, an elevation of the surface 1 is measured at intervals of 1 mm to obtain elevation data about the surface 1. In the barrier films 100 for a wavelength conversion sheet shown in FIG. 1 to FIG. 3, the upper surface shown in each figure corresponds to the surface 1 of condition 1 of the present disclosure.

Means for obtaining the elevation data about the surface 1 are not particularly limited. Elevation data measuring apparatuses can be broadly classified into a contact-type measuring apparatus and a non-contact-type measuring apparatus, and a non-contact-type measuring apparatus is preferable because it can easily measure the elevation of a minute region. A general-purpose measuring apparatus can be used as the elevation data measuring apparatus. Examples of the non-contact-type elevation data measuring apparatus include the trade name "LINE STRIPER [HIU-LS400]" manufactured by Hakko Automation Co., Ltd.

When using the above product manufactured by Hakko Automation Co., Ltd., the region for obtaining an elevation in one measurement is preferably 200 mm to 300 mm in the flow direction×200 mm to 400 mm in the width direction, and more preferably 200 mm in the flow direction×200 mm in the width direction. When the size of the barrier film is larger than the above region, elevation measurement may be carried out a plurality of times. Whether or not an irregularity is generated on the surface 1 can be determined by the distortion of a light source such as a fluorescent lamp when the light source is projected onto the surface 1. Because of this, a portion where the light source is not distorted may be regarded as a portion having no irregularity, and elevation measurement therefor may be omitted.

Condition 1 stipulates that at least a part of the surface 1 includes at least one or more irregularity 1 having a height difference between an adjacent peak and valley of 0.001 mm or more and 0.600 mm or less in the contour curve 1 in a predetermined direction.

The reason for stipulating that the height difference of the irregularity 1 is 0.001 mm or more and 0.600 mm or less is that the problem of uneven brightness is unlikely to arise unless the surface 1 has an irregularity having a height difference of 0.001 mm or more. In addition, the reason for stipulating that the height difference of the irregularity 1 is 0.600 mm or less is that when the surface 1 has an irregularity having a height difference of more than 0.600 mm, it is difficult to solve the problem of uneven brightness even if condition 1 is satisfied.

The contour curve 1 in a predetermined direction may have an irregularity having a height difference of less than 0.001 mm, but shall not have an irregularity having a height difference of more than 0.600 mm.

The surface 1 may have a portion that does not have an irregularity 1 having a height difference between an adjacent peak and valley of 0.001 mm or more and 0.600 mm or less. As used herein, the above portion may be referred to as a "further portion."

The further portion may have an irregularity having a height difference of less than 0.001 mm between an adjacent peak and valley, but shall not have an irregularity having a height difference of more than 0.600 mm.

The irregularity 1 is included in the contour curve 1 in a predetermined direction. The "predetermined direction" may be the width direction if it is possible to distinguish between the flow direction and the width direction at the time of production of the barrier film. This is because as described above, the direction in which the peaks and the valleys of the irregularity extend is the flow direction, and thus it is possible to appropriately distinguish between the elevation and the width of the irregularity on the surface 1 by setting the width direction as the predetermined direction. In other words, the predetermined direction may be a direction approximately orthogonal to the direction in which the peaks and the valleys of the irregularity extend. As used herein, "approximately orthogonal" means 90°±10°.

After the barrier film is cut into a sheet, it is difficult to distinguish between the flow direction and the width direction of the barrier film. However, a sheet-like barrier film is usually a quadrangle having four right-angled corners. In addition, a barrier film cut into a quadrangle having four right-angled corners has two pairs of opposite sides, and it can be deemed that the direction of one pair of opposite sides is the flow direction, and that the direction of the other pair of opposite sides is the width direction. In addition, as described above, the direction in which the peaks and the valleys of the irregularity extend is the flow direction. Therefore, when a sheet-like barrier film that is a quadrangle having four right-angled corners has an irregularity, it is easy to distinguish between the flow direction and the width direction. Because of this, even when a sheet-like barrier film has an irregularity, the predetermined direction may be the width direction. Even when a sheet-like barrier film has an irregularity, the predetermined direction may be a direction approximately orthogonal to the direction in which the peaks and the valleys of the irregularity extend.

The proportion of the length of the irregularity 1 to the total length of the barrier film in the predetermined direction is not particularly limited, and is usually 3% or more and 50% or less.

In condition 1, when the height difference and the width of the irregularity 1 are defined as H [mm] and W [mm], respectively, the following expression (1):

$$H/W^2 \leq 1.5 \times 10^{-5} \tag{1}$$

needs to be satisfied.

A large $H/W^2$ means that the slope of the irregularity 1 is steep. When a quantum dot-containing layer is formed by applying and drying a coating liquid for a quantum dot-containing layer on the surface 1 where the slope of the irregularity 1 is steep, the resulting quantum dot-containing layer has an uneven thickness, and the thickness tends to change rapidly. It can be deemed that the brightness of the wavelength conversion sheet is proportional to the thickness of the quantum dot-containing layer. Because of this, when $H/W^2$ is large, in-plane uneven brightness of the wavelength conversion sheet easily occurs. On the other hand, by setting $H/W^2$ to $1.5 \times 10^{-5}$ or less, it is possible to suppress the rapid change in the thickness of the quantum dot-containing layer, and thus it is possible to easily suppress the occurrence of in-plane uneven brightness of the wavelength conversion sheet.

In expression (1), the height difference H [mm] of the irregularity 1 is divided by the square of the width W [mm]. The reason for dividing the height difference by the square of the width is to emphasize the Mach effect. The Mach effect is "a visual psychological phenomenon in which a darker band and a brighter band are seen on the darker side and the brighter side, respectively, near the boundary in an image having the stepwise brightness changes." That is, in the present disclosure, expression (1) divides the height difference by the square of the width in order to make the Mach effect less likely to occur. When $H/W^2$ exceeds $1.5 \times 10^{-5}$ and does not satisfy expression (1), a streak-like rapid change in brightness occurs within the plane of the wavelength conversion sheet and is, because of the Mach effect, easily recognized as in-plane uneven brightness of the wavelength conversion sheet.

Condition 1 specifies that at least one or more irregularity 1 having a height difference of 0.001 mm or more and 0.600 mm or less is present. The number of irregularities 1 may be one, or may be two or more. When the number of irregularities 1 is two or more, all the irregularities 1 shall satisfy expression (1).

As described above, the peaks and the valleys of the irregularities extend in the flow direction. Because of this, in the present disclosure, it is preferable to obtain a plurality of contour curves 1 in a predetermined direction within the plane of the barrier film. When a plurality of contour curves 1 are obtained, all contour curves 1 having an irregularity 1 preferably satisfy expression (1).

A plurality of contour curves are preferably obtained at a predetermined interval. The interval at which a contour curve is obtained is preferably 10 mm or less, more preferably 5 mm or less, and most preferably 1 mm.

In condition 1, $H/W^2$ is preferably $1.4 \times 10^{-5}$ or less, and more preferably $1.3 \times 10^{-5}$ or less.

Within the plane of the barrier film, the stress applied to the barrier film is different between two points of a point having the irregularity 1 and a point not having the irregularity 1. For example, the barrier film may be shrunk by a cause such as heat, and in such a case, different stresses are applied to a point having the irregularity 1 and a point not having the irregularity 1. A temporary stress or an accumulation of stress over time may cause a defect at a point of the barrier film having the irregularity 1.

In condition 1, when the value of $H/W^2$ is too small, the barrier film will include "an irregularity 1 that has too large a width W." That is, in condition 1, when the value of $H/W^2$ is too small, the above defect may occur over a wide range. Because of this, in condition 1, $H/W^2$ is preferably $0.1 \times 10^{-5}$ or more, and more preferably $0.2 \times 10^{-5}$ or more.

A method for determining the height difference H [mm] of the irregularity 1 and the width W [mm] of the irregularity 1 herein will be described with reference to FIG. 7. In FIG. 7, the vertical axis represents the elevation in mm, and the horizontal axis represents the width in mm. The line going up and down in FIG. 7 is an example of a contour curve 1 of the surface 1.

First, the peaks and the valleys of the contour curve 1 are identified. In FIG. 7, a point marked with "●" corresponds to a peak, and a point marked with "▼" corresponds to a valley. A peak is a so-called top, and a valley is a so-called bottom. Herein, when a peak and a valley are identified, an irregularity having a height difference of less than 0.001 mm is excluded. For example, in FIG. 7, there are a plurality of minute irregularities having a height difference of less than 0.001 mm on the left side of the central valley, and peaks and valleys are identified while excluding such minute irregularities having a height difference of less than 0.001 mm.

One irregularity is formed by two peaks and one valley, or two valleys and one peak. Because of this, in an irregularity formed by two peaks and one valley, the interval between the adjacent peaks is the irregularity interval W. On the other hand, in an irregularity formed by two valleys and one peak, the interval between the adjacent valleys is the irregularity interval W. In FIG. 7, W1, W2, and W3 each represent the width of an irregularity.

As described above, one irregularity is formed by two peaks and one valley, or two valleys and one peak. Because of this, one irregularity has two height differences. For example, the irregularity on the left side in FIG. 7 has a height difference H1 and a height difference H2. Herein, when two height differences of one irregularity are different, the larger height difference is regarded as the height difference H of the irregularity. For example, in the irregularity on the left side in FIG. 7, H1 is larger than H2, and thus H1 is the height difference H; in the irregularity at the center, H2 is larger than H3, and thus H2 is the height difference H; and in the irregularity on the right side, H3 is larger than H4, and thus H3 is the height difference H.

Condition 1 can be easily satisfied by, for example, the following (1) to (6). Among the following (1) to (6), the following (1) and (5) are important, and the following (1) is the most important.

(1) By setting a low tension when conveying the first base material film and the second base material film, minute streaks generated in the flow direction of the first base material film and the second base material film are suppressed. When the tension is too strong, unevenness in the tension easily occurs in the width direction of the base material films, and thus minute streaks are easily generated. Because of this, it is preferable to intentionally set a low tension when conveying the first base material film and the second base material film. When the irregularity on the surface 1 does not satisfy condition 1 at the time of production with an arbitrary tension, test productions may be carried out while the tension is decreased by 10% in each test production. A specific value of the tension cannot be generalized because it varies depending on the length of the apparatus and the others. In view of lowering the tension, the first base material film and the second base material film are preferably stretched films. A stretched film tends to have good stiffness, and thus the flatness of the film can be easily maintained even when the tension when conveying the film is lowered.

(2) A less shrinkable material is selected as a material constituting the barrier film.

(3) Contamination with moisture is avoided when aging the barrier film. For example, the barrier film is packaged in a moisture-proof material.

(4) A pad plate, also simply called a pad, is attached to the core of the barrier film wound into a roll to suppress contamination with moisture from an end portion of the barrier film.

(5) The thickness of the first base material film and the second base material film are increased.

(6) When the barrier film is wound into a roll, it is ensured that the winding length of the barrier film is not too long in order to suppress gradual piling up of peaks and valleys.

Herein, when measuring various parameters such as condition 1 and the thickness of a layer, the measurement shall be carried out in an atmosphere at a temperature of 23°

C.±5° C. and a relative humidity of 40% or more and 65% or less, unless otherwise specified. Further, a sample shall be exposed to the atmosphere for at least 30 minutes before measuring various parameters.

<Primer Layer>

In the barrier film of the first embodiment of the present disclosure, the position of the primer layer is preferably the outermost layer of the barrier film. The outermost layer means the outermost layer on the side having the primer layer with respect to the adhesive layer. Having a primer layer at the position described above is preferable in view of improving the close adhesion between the barrier film and the quantum dot-containing layer. The outermost layer is preferably the outermost layer on the side having the first base material film with respect to the adhesive layer.

The primer layer preferably includes a resin component. Examples of the resin component include a polyester-based resin, a polyurethane-based resin, and an acrylic-based resin. Among these, a polyurethane-based resin is preferable. That is, the primer layer preferably includes a polyurethane-based resin.

The polyurethane-based resin can easily improve the close adhesion to the quantum dot-containing layer. In addition, the polyurethane-based resin can easily relax the stress generated when the quantum dot-containing layer is cured by ionizing radiation or by heat.

Examples of the polyurethane-based resin include a reaction product of a one-pack or two-pack polyurethane-based resin composition obtained by reacting a polyfunctional isocyanate with a hydroxyl group-containing compound. Only one of each of the polyfunctional isocyanate and the hydroxyl group-containing compound may be used, or a plurality of each thereof may be used.

Specific examples of the polyfunctional isocyanate include an aromatic polyisocyanate such as tolylene diisocyanate, diphenylmethane diisocyanate, xylylene diisocyanate, or polymethylene polyphenylene polyisocyanate, and an aliphatic polyisocyanate such as hexamethylene diisocyanate or isophorone diisocyanate.

Examples of the hydroxyl group-containing compound include a polyether polyol, a polyester polyol, a polyester polyurethane polyol, and a polyacrylate polyol. In the present disclosure, a polyester polyurethane polyol is particularly preferable in view of close adhesion to the quantum dot-containing layer and durability. The polyester polyurethane polyol can be produced, for example, by the method described in JP 2001-288408 A or JP 2003-26996 A.

The content of the polyurethane-based resin is preferably 40% by mass or more, and more preferably 70% by mass or more based on the total amount of the primer layer.

The primer layer may further contain a silane coupling agent. For the silane coupling agent, a functional group present at one end of the molecule thereof, which is usually a chloro, alkoxy, or acetoxy group, for example, is hydrolyzed to form a silanol group (Si—OH), whereby the resin composition of the primer layer is modified with a covalent bond or the others to form a strong bond. In addition, an organic functional group present at the other end of the silane coupling agent, such as a vinyl, methacryloxy, amino-based, epoxy-based, or mercapto group, can easily improve the close adhesion between the primer layer and the quantum dot-containing layer.

Examples of the silane coupling agent include γ-chloropropyltrimethoxysilane, vinyltrichlorosilane, vinyltriethoxysilane, vinyl-tris(β-methoxyethoxy)silane, γ-methacryloxypropyltrimethoxysilane, β-(3,4-epoxycyclohexyl)ethyltrimethoxysilane, γ-glycidoxypropyltrimethoxysilane, vinyltriacetoxysilane, γ-mercaptopropyltrimethoxysilane, N-β(aminoethyl)-γ-aminopropyltrimethoxysilane, N-β(aminoethyl)-γ-aminopropylmethyldimethoxysilane, γ-ureidopropyltriethoxysilane, bis(p-hydroxyethyl)-γ-aminopropyltriethoxysilane, and γ-aminopropylsilicone, and one or two or more thereof can be used.

The content of the silane coupling agent is preferably 1% by mass or more, and more preferably 3% by mass or more based on the total amount of the primer layer. When the content of the silane coupling agent is in the above range, the close adhesion between the primer layer and the quantum dot-containing layer can be easily further improved.

For improving the extensibility of the primer layer and suppressing the occurrence of a crack in the primer layer, the content of the silane coupling agent is preferably 30% by mass or less, and more preferably 20% by mass or less based on the total amount of the primer layer.

The primer layer may further include a filler. The filler has the role of adjusting the viscosity or the like of a coating liquid for forming a primer layer to improve the coating suitability or the like. As the filler, for example, calcium carbonate, barium sulfate, alumina white, silica, talc, a glass frit, or a resin powder can be used.

The primer layer may further include an additive such as a stabilizer, a crosslinking agent, a lubricant, an ultraviolet absorber, or the like, as necessary.

If the thickness ti of the primer layer is too small, the close adhesion between the primer layer and the quantum dot-containing layer may decrease, or the stress of the quantum dot-containing layer may fail to be sufficiently relaxed. If the thickness ti is too large, the effect of close adhesion is saturated.

Because of this, the lower limit of the thickness ti is preferably 100 nm or more, more preferably 150 nm or more, and further preferably 200 nm or more. The upper limit of the thickness ti is preferably 900 nm or less, more preferably 600 nm or less, further preferably 500 nm or less, and more further preferably 450 nm or less.

When a plurality of upper limit options and a plurality of lower limit options of a numerical value are indicated in a constitutional requirement shown herein, one selected from the upper limit options and one selected from the lower limit options can be combined to provide an embodiment of a numerical range.

For the thickness of the primer layer as described above, examples of the embodiment of a numerical range thereof include 100 nm or more and 900 nm or less, 100 nm or more and 600 nm or less, 100 nm or more and 500 nm or less, 100 nm or more and 450 nm or less, 150 nm or more and 900 nm or less, 150 nm or more and 600 nm or less, 150 nm or more and 500 nm or less, 150 nm or more and 450 nm or less, 200 nm or more and 900 nm or less, 200 nm or more and 600 nm or less, 200 nm or more and 500 nm or less, and 200 nm or more and 450 nm or less.

Herein, the thickness of each layer constituting the barrier film and the thickness of the quantum dot-containing layer can be calculated, for example, by photographing a cross section using a scanning transmission electron microscope, measuring the thicknesses at 20 points from an image of the cross section, and averaging the values at the 20 points.

<Base Material Film>

The barrier film of the first embodiment of the present disclosure has a first base material film and a second base material film as base material films. Since the barrier film has two base material films as described above, it is possible to improve the stiffness and the strength of the barrier film while improving the efficiency of forming a barrier layer.

The first base material film and the second base material film are not particularly limited as long as these are resin films that do not impair a function of the wavelength conversion sheet.

Examples of the first base material film and the second base material film include resin films formed of one or more resins selected from the group consisting of polyester, triacetyl cellulose (TAC), cellulose diacetate, cellulose acetate butyrate, polyamide, polyimide, polyethersulfone, polysulfone, polypropylene, polymethylpentene, polyvinyl chloride, polyvinyl acetal, polyether ketone, acrylic, polycarbonate, polyurethane, an amorphous olefin (Cyclo-Olefin-Polymer: COP), and the like. These resin films are preferably stretched films, and more preferably biaxially stretched films, in view of imparting predetermined stiffness.

Among these resin films, a stretched polyester film is preferable, and a biaxially stretched polyester film is more preferable, in view of mechanical strength, dimensional stability, and heat resistance. Examples of the polyester film include a polyethylene terephthalate film and a polyethylene naphthalate film.

The first base material film and the second base material film may be the same resin film or different resin films.

The total light transmittance according to JIS K7361-1: 1997 of the first base material film and the second base material film are preferably 80% or more, more preferably 85% or more, and further preferably 87% or more.

A surface treatment may be applied to the surface of the side of the first base material film and the second base material film on which a barrier layer is provided, in order to improve the close adhesion or the like. Examples of the surface treatment include corona discharge treatment, ozone treatment, low temperature plasma treatment using oxygen gas, nitrogen gas, or the like, glow discharge treatment, and oxidation treatment using a chemical or the like.

When the thickness of the first base material film and the thickness of the second base material film are defined as T1 and T2, respectively, it is preferable that T1<T2. Satisfying T1<T2 makes it possible to easily improve the stiffness and the strength of the barrier film while improving the efficiency of forming a barrier layer. The effects described above are particularly effective in the above laminated configurations (A1) and (A2).

When satisfying T1<T2, an irregularity tends to be easily generated on the surface 1 because of the thinness of T1. However, even if an irregularity is generated on the surface 1, it is possible to easily suppress the occurrence of in-plane uneven brightness of the wavelength conversion sheet, since the barrier film of the present disclosure satisfies condition 1.

The thickness of the first base material film is preferably 5 µm or more, more preferably 8 µm or more, and further preferably 10 µm or more. Setting the thickness of the first base material film to 5 µm or more makes it possible to easily satisfy condition 1 and easily improve the handleability of the barrier film.

The thickness of the first base material film is preferably 100 µm or less, more preferably 75 µm or less, more preferably 50 µm or less, and more preferably 27 µm or less, in order to achieve thinning and make it easy to suppress invasion by water vapor and oxygen from an end portion. In addition, setting the thickness of the first base material film within the above range makes it possible to easily improve the efficiency of forming a barrier layer.

The thickness of the second base material film is preferably 10 µm or more, more preferably 20 µm or more, and further preferably 30 µm or more. Setting the thickness of the second base material film to 10 µm or more makes it possible to easily satisfy condition 1 and easily improve the handleability of the barrier film.

The thickness of the second base material film is preferably 200 µm or less, more preferably 150 µm or less, more preferably 100 µm or less, and more preferably 75 µm or less, in view of thinning and making it easy to suppress invasion by water vapor and oxygen from an end portion.

The lower limit of T2/T1 is preferably 2.0 or more, more preferably 3.0 or more, and further preferably 3.5 or more, and the upper limit thereof is preferably 10.0 or less, more preferably 9.0 or less, and further preferably 8.5 or less.

Setting T2/T1 to 2.0 or more makes it possible to easily support the barrier film as a whole by the second base material film having a large thickness, and thus it is possible to easily suppress the generation of an irregularity in the barrier film. Setting T2/T1 to 10.0 or less makes it possible to easily suppress the concentration of stress on the first base material film having a small thickness, and thus it is possible to easily suppress the generation of an irregularity in the barrier film.

<Barrier Layer>

In the barrier film of the first embodiment, the barrier layer can be formed at, for example, at least one of an arbitrary position between the adhesive layer and the primer layer and an arbitrary position on the opposite side of the adhesive layer from the primer layer.

The barrier layer is preferably formed on the first base material film or the second base material film.

The barrier layer can be formed, for example, by vapor depositing, applying, or the like a component for the barrier layer on at least one of the first base material film and the second base material film.

The barrier layer may be formed on one of the first base material film and the second base material film as shown in FIG. 1 and FIG. 2. The barrier layer may be formed on both of the first base material film and the second base material film as shown in FIG. 3.

For the barrier film of the first embodiment, examples of the barrier layer include: a single layer of a single type selected from the group consisting of "an inorganic oxide layer formed by vapor-depositing an inorganic oxide," "an organic coating layer formed by applying a coating agent including a water-soluble polymer such as polyvinyl alcohol" and "a layer including a reaction product of a composition including a metal oxide and a phosphorus compound"; a layer obtained by laminating a single type selected from the above group; and a layer obtained by laminating two or more selected from the above group. Among these, a laminate of an inorganic oxide layer and an organic coating layer is preferable. That is, the barrier layer preferably includes an inorganic oxide layer and an organic coating layer.

Examples of the layer including a reaction product of a composition including a metal oxide and a phosphorus compound include the layer disclosed in WO 2011/122036.

Hereinafter, embodiments of the inorganic oxide layer and the organic coating layer will be described.

When the barrier layer on the first base material film has an inorganic oxide layer and an organic coating layer, the barrier layer preferably has the first base material film, the inorganic oxide layer, and the organic coating layer in presented order. When the barrier layer on the second base material film has an inorganic oxide layer and an organic coating layer, the barrier layer preferably has the second base material film, the inorganic oxide layer, and the organic coating layer in presented order.

The barrier layer more preferably has a first inorganic oxide layer, a first organic coating layer, a second inorganic oxide layer, and a second organic coating layer in presented order, in view of improving the barrier property. When the barrier layer on the first base material film has the above configuration, the barrier layer preferably has the first base material film, the first inorganic oxide layer, the first organic coating layer, the second inorganic oxide layer, and the second organic coating layer in presented order. When the barrier layer on the second base material film has the above configuration, the barrier layer has the second base material film, the first inorganic oxide layer, the first organic coating layer, the second inorganic oxide layer, and the second organic coating layer in presented order.

«Inorganic Oxide Layer»

Examples of an inorganic oxide for the inorganic oxide layer include one or more selected from aluminum oxide, silicon oxide, and magnesium oxide. Aluminum oxide or silicon oxide is preferable in view of imparting a sufficient barrier property to the barrier film and for production efficiency of the barrier film. Aluminum oxide is more preferable for color suppression.

The inorganic oxide layer can be formed, for example, by a physical vapor deposition method such as a vacuum vapor deposition method, a sputtering method, and an ion plating method, or a chemical vapor deposition method such as a plasma chemical vapor deposition method, a thermochemical vapor deposition method, and a photochemical vapor deposition method. Among these, a vacuum vapor deposition method, which has a high vapor deposition rate and good productivity, is preferable.

When the inorganic oxide layer includes silicon oxide, the content of silicon oxide in each layer is preferably 80% by mass or more, more preferably 90% by mass or more, and further preferably 95% by mass or more on a mass basis.

When the inorganic oxide layer includes aluminum oxide, the content of aluminum oxide in each layer is preferably 80% by mass or more, more preferably 90% by mass or more, and further preferably 95% by mass or more on a mass basis.

The preferable thickness of the inorganic oxide layer varies depending on the type of the inorganic oxide, and thus cannot be generalized. When the inorganic oxide layer includes silicon oxide or aluminum oxide, the thickness of the inorganic oxide layer is preferably in the following range.

When the inorganic oxide layer includes silicon oxide, the thickness of the inorganic oxide layer is preferably 20 nm or more, more preferably 50 nm or more, and further preferably 70 nm or more in order to improve the barrier property.

When the inorganic oxide layer includes silicon oxide, the thickness of the inorganic oxide layer is preferably 220 nm or less, more preferably 180 nm or less, more preferably 160 nm or less, more preferably 140 nm or less, and more preferably 100 nm or less. By setting the thickness to 220 nm or less, the occurrence of a scratch and a crack in the inorganic oxide layer can be easily suppressed and the color derived from silicon oxide can be easily suppressed.

When the inorganic oxide layer includes aluminum oxide, the thickness of the inorganic oxide layer is preferably 6 nm or more, and more preferably 7 nm or more in order to improve the barrier property.

When the inorganic oxide layer includes aluminum oxide, the thickness of the inorganic oxide layer is preferably 25 nm or less, more preferably 20 nm or less, more preferably 15 nm or less, more preferably 12 nm or less, and more preferably 10 nm or less. By setting the thickness to 25 nm or less, the occurrence of a scratch and a crack in the inorganic oxide layer can be easily suppressed.

«Organic Coating Layer»

The organic coating layer preferably includes one or more selected from a water-soluble polymer and a metal alkoxide-based compound. The organic coating layer includes more preferably one or more selected from the group consisting of a water-soluble polymer, and further preferably one or more selected from the group consisting of a water-soluble polymer and one or more selected from the group consisting of a metal alkoxide-based compound, among a water-soluble polymer and a metal alkoxide-based compound.

The organic coating layer has better flexibility than the inorganic oxide layer. Accordingly, by having an organic coating layer in addition to an inorganic oxide layer, the occurrence of a scratch and a crack in the inorganic oxide layer can be easily suppressed, and the barrier property of the barrier film can be easily improved.

Examples of the water-soluble polymer include polyvinyl alcohol, polyvinylpyrrolidone, and an ethylene-vinyl alcohol copolymer. Among these, polyvinyl alcohol and an ethylene-vinyl alcohol copolymer are preferable, and polyvinyl alcohol is more preferable, in view of the barrier property. That is, the organic coating layer includes preferably one or more selected from the group consisting of polyvinyl alcohol and an ethylene-vinyl alcohol copolymer, and more preferably polyvinyl alcohol.

When the organic coating layer contains a water-soluble polymer and a metal alkoxide-based compound, the content of the water-soluble polymer is preferably 5 parts by mass or more and 500 parts by mass or less, more preferably 7 parts by mass or more and 100 parts by mass or less, and further preferably 8 parts by mass or more and 50 parts by mass or less, per 100 parts by mass in total of the metal alkoxide-based compound.

Examples of the metal alkoxide-based compound include a metal alkoxide, a metal alkoxide hydrolysate, and a metal alkoxide polymer.

The metal alkoxide is a compound represented by the general formula $M(OR)_n$. In the formula, M represents a metal such as Si, Ti, Al, and Zr, and R represents an alkyl group such as a methyl group and an ethyl group. Specific examples of the metal alkoxide include tetramethoxysilane, tetraethoxysilane, and isopropoxyaluminum.

An organic coating layer can be formed, for example, by applying a coating liquid including a component constituting the organic coating layer on the inorganic oxide layer and drying the same. The coating liquid may contain an additive such as a silane coupling agent, a curing agent, or a dispersant.

The thickness of the organic coating layer is preferably 70 nm or more, more preferably 100 nm or more, and further preferably 150 nm or more in order to improve the barrier property.

The thickness of the organic coating layer is preferably 600 nm or less, more preferably 480 nm or less, more preferably 370 nm or less, and further preferably 300 nm or less. When the thickness is 600 nm or less, the barrier film can be thinned. If the thickness of the organic coating layer is too large, the stress generated when the organic coating layer is applied and dried is large, and the stress may cause a crack in the inorganic oxide layers and reduce the barrier property. Accordingly, by setting the thickness to 600 nm or less, the initial barrier property can be easily improved.

<Adhesive Layer>

In the barrier film of the first embodiment, the adhesive layer is positioned between the first base material film and the second base material film. The adhesive layer is used to integrate the layers constituting the barrier film.

Examples of the adhesive layer include a pressure-sensitive adhesive layer, a curable adhesive layer, and a heat-sensitive adhesive layer. Among these, a curable adhesive layer, which can easily improve close adhesion, is preferable.

When the adhesive layer is a curable adhesive layer, the adhesive layer preferably includes a thermosetting adhesive. The thermosetting adhesive is a composition that has the property of crosslinking due to a chemical reaction caused by heat. The composition preferably includes a base resin and a curing agent. The curing agent is preferably an isocyanate-based curing agent that can easily improve the close adhesion to a polyester film. In other words, the adhesive layer preferably includes a cured product of a composition for an adhesive layer including an isocyanate-based curing agent.

Examples of the thermosetting adhesive include a two-component curable urethane-based adhesive, a polyester urethane-based adhesive, a polyether urethane-based adhesive, an acrylic adhesive, a polyester-based adhesive, a polyamide-based adhesive, a polyvinyl acetate-based adhesive, an epoxy-based adhesive, and a rubber-based adhesive. Among these, a two-component curable urethane-based adhesive is preferable because it can easily improve the close adhesion to a polyester film. The two-component curable urethane-based adhesive provides a urethane-based resin constituted of a polyurethane containing a polyol as a base resin and an isocyanate as a crosslinking agent.

Examples of the isocyanate-based curing agent include an aromatic polyisocyanate such as tolylene diisocyanate, diphenylmethane diisocyanate, xylylene diisocyanate, or polymethylene polyphenylene polyisocyanate, and an aliphatic polyisocyanate such as hexamethylene diisocyanate or isophorone diisocyanate.

The thickness of the adhesive layer is preferably 3 µm or more and 30 µm or less, more preferably 3 µm or more and 20 µm or less, and further preferably 4 µm or more and 8 µm or less.

By setting the thickness of the adhesive layer to 3 µm or more, the adhesiveness between the first base material film and the second base material film can be easily improved. By setting the thickness of the adhesive layer to 30 µm or less, curing shrinkage of the adhesive layer can be suppressed, and condition 1 can be easily satisfied.

<Other Layer>

The barrier film of the first embodiment may have, "a layer other than the first base material film, the second base material film, the barrier layer, the primer layer, or the adhesive layer (other layer)" as long as the other layer does not impair the effect of the barrier film.

Examples of the other layer include an anti-sticking layer. The anti-sticking layer is preferably positioned, for example, on the outermost layer on the side opposite to the side having the primer layer with respect to the adhesive layer.

«Anti-Sticking Layer»

The anti-sticking layer preferably includes a filler and a binder resin.

Examples of the binder resin include an acrylic resin, an epoxy resin, a urethane resin, a polyester-based resin, a polyester acrylate-based resin, a polyurethane acrylate-based resin, an acrylic urethane-based resin, and an epoxy acrylate-based resin.

Examples of the filler include an inorganic filler and an organic filler, and an organic filler, which can easily improve optical performance, is preferable. Examples of a resin constituting the organic filler include an acrylic resin and a polystyrene-based resin.

The refractive index difference between the refractive index of the filler and the refractive index of the binder resin is preferably 0.5 or less, more preferably 0.3 or less, and further preferably 0.1 or less.

The average particle size of the filler is preferably 1.0 µm or more and 50 µm or less and more preferably 1.5 µm or more and 10 µm or less. When the average particle size of the filler is 1.0 µm or more, sticking can be effectively suppressed. When the average particle size of the filler is 50 µm or less, the filler can be made difficult to detach from the anti-sticking layer. The average particle size means the volume average value d50 in particle size distribution measurement by a laser light diffraction method.

The content of the filler is preferably 5% by mass or more and 50% by mass or less, and more preferably 10% by mass or more and 40% by mass or less, based on the total amount of the anti-sticking layer.

The thickness of the anti-sticking layer is preferably 1.0 µm or more and 50.0 µm or less, and more preferably 1.5 µm or more and 10.0 µm or less.

<Physical Properties>

«Water Vapor Transmission Rate»

The barrier films of the first embodiment and the second embodiment have a value of water vapor transmission rate according to JIS K7129-2:2019 of preferably 0.20 g/m²·day or less and more preferably 0.15 g/m²·day or less. The conditions for measuring the water vapor transmission rate are a temperature of 40° C. and a relative humidity of 90%.

The water vapor transmission rate can be measured, for example, using a water vapor transmission rate measuring apparatus (trade name: PERMATRAN) manufactured by MOCON, Inc.

«Oxygen Transmission Rate»

The barrier films of the first embodiment and the second embodiment preferably have a value of oxygen transmission rate according to JIS K7126-2:2006 of 0.5 cc/m·day·atm or less. The conditions for measuring the oxygen transmission rate are a temperature of 23° C. and a relative humidity of 90%.

The oxygen transmission rate can be measured, for example, using an oxygen transmission rate measuring apparatus (trade name: OX-TRAN) manufactured by MOCON, Inc (MOCON method).

«b* Value»

The barrier films of the first embodiment and the second embodiment have a b* value in the L*a*b* color system of preferably 1.0 or less, more preferably −2.5 or more and 1.0 or less, and further preferably −2.0 or more and 0.8 or less.

The L*a*b* color system is based on the L*a*b* color system standardized by the International Commission on Illumination (CIE) in 1976 and is adopted in JIS Z8781-4:2013.

«Total Light Transmittance»

The barrier films of the first embodiment and the second embodiment have a total light transmittance according to JIS K7361-1:1997 of preferably 80% or more, more preferably 85% or more, and further preferably 87% or more.

«Haze»

The barrier films of the first embodiment and the second embodiment have a haze according to JIS K7136:2000 of preferably 10% or more, more preferably 20% or more, more preferably 40% or more, and more preferably 60% or more.

«Spectral Transmittance»

The barrier films of the first embodiment and the second embodiment have a spectral transmittance at a wavelength of 450 nm of preferably 75% or more, more preferably 80% or more, and further preferably 85% or more.

«Ratios of Optical Properties»

In the barrier films of the first embodiment and the second embodiment, the ratio of the total light transmittance of a region not having the irregularity 1 to the total light transmittance of a region having the irregularity 1 is preferably 0.95 or more and 1.05 or less.

Setting the ratio to 0.95 or more and 1.05 or less makes it possible to more easily suppress in-plane uneven brightness of the wavelength conversion sheet.

In the barrier films of the first embodiment and the second embodiment, the ratio of the haze of a region not having the irregularity 1 to the haze of a region having the irregularity 1 is preferably 0.90 or more and 1.10 or less.

Setting the ratio to 0.90 or more and 1.10 or less makes it possible to more easily suppress in-plane uneven brightness of the wavelength conversion sheet.

<Production Method>

The method for producing the barrier film of the first embodiment of the present disclosure is not particularly limited. One embodiment of the method for producing the barrier film of the first embodiment of the present disclosure include the following steps 1 to 4.

Step 1: forming a barrier layer on at least one of a first base material film and a second base material film.

Step 2: forming a primer layer on the first base material film. The primer layer may be formed on the barrier layer formed in step 1.

Step 3: obtaining a laminated body 1 by laminating the opposite side of the first base material film from the side having the primer layer with the second base material film via an adhesive layer. When a barrier layer is formed on a second base material film in step 1, it is preferable to allow the opposite side of the second base material film from the side having the barrier layer and the opposite side of the first base material film from the side having the primer layer to face each other and bond these base material films via an adhesive layer.

Step 4: aging the laminated body 1 to allow curing of the adhesive layer to proceed.

The temperature and the time of aging in step 4 are not particularly limited as long as the temperature and the time allow the curing reaction to proceed. The temperature is preferably 30° C. or more and 50° C. or less, and the time is preferably 48 hours or more and 168 hours or less. During the aging in step 4, it is preferable to suppress invasion by moisture as described above.

<Applications>

The barrier films for a wavelength conversion sheet according to the first embodiment and the second embodiment of the present disclosure can be used, for example, as a barrier film for a wavelength conversion sheet of a surface light source. Examples of the surface light source include a backlight light source of a liquid crystal display apparatus and a backlight light source of an inspection device. That is, the barrier film for a wavelength conversion sheet according to the present disclosure can be used as a "barrier film for a wavelength conversion sheet of a backlight light source of a liquid crystal display apparatus," a "barrier film for a wavelength conversion sheet of a backlight light source of an inspection device," or the like.

Further, the barrier film for a wavelength conversion sheet according to the present disclosure can also be used as a "barrier film for a wavelength conversion sheet for horticulture." Examples of the wavelength conversion sheet for horticulture include a sheet having the function of converting an ultraviolet ray into a wavelength suitable for plant growth. Examples of the wavelength suitable for plant growth include a wavelength suitable for photosynthesis. The wavelength conversion sheet for horticulture can be installed, for example, on a ceiling or the like of a horticultural facility such as a plastic greenhouse and a glasshouse.

[Barrier Film for Wavelength Conversion Sheet According to Second Embodiment]

The barrier film for a wavelength conversion sheet according to a second embodiment of the present disclosure is a barrier film for a wavelength conversion sheet, comprising a base material film, a barrier layer, and a primer layer in presented order, wherein the barrier film satisfies the following condition 1':

<Condition 1'>

A surface of the barrier film on a side having the primer layer with respect to the barrier layer is defined as a surface 1'; an elevation of the surface 1' is measured at intervals of 1 mm to obtain elevation data about the surface 1'; a contour curve of the surface 1' determined by the elevation data is defined as a contour curve 1'; at least a part of the surface 1' comprises at least one or more irregularity 1' having a height difference between an adjacent peak and valley of 0.001 mm or more and 0.600 mm or less in the contour curve 1' in a predetermined direction; when a height difference and a width of the irregularity 1' are defined as H [mm] and W [mm], respectively, the following expression (1'):

$$H/W^2 \le 1.5 \times 10^{-5} \qquad (1')$$

is satisfied.

<Laminated Configuration>

Examples of the laminated configuration of the barrier film of the second embodiment of the present disclosure include the following (B1). The barrier film of the present disclosure is not limited to the laminated configuration of the following (B1). When the barrier film having the following (B1) further has an anti-sticking layer, the barrier film preferably has the anti-sticking layer on an opposite side of the base material film from the side having the barrier layer.

(B1) A laminated configuration having a base material film, a barrier layer, and a primer layer in presented order.

The barrier film of the second embodiment of the present disclosure needs to satisfy the following condition 1'. If the barrier film does not satisfy condition 1', it is not possible to suppress in-plane uneven brightness of the wavelength conversion sheet:

<Condition 1'>

A surface of the barrier film on a side having the primer layer with respect to the barrier layer is defined as a surface 1'; an elevation of the surface 1' is measured at intervals of 1 mm to obtain elevation data about the surface 1'; a contour curve of the surface 1' determined by the elevation data is defined as a contour curve 1'; at least a part of the surface 1' comprises at least one or more irregularity 1' having a height difference between an adjacent peak and valley of 0.001 mm or more and 0.600 mm or less in the contour curve 1' in a predetermined direction; when a height difference and a width of the irregularity 1' are defined as H [mm] and W [mm], respectively, the following expression (1'):

$$H/W^2 \leq 1.5 \times 10^{-5} \quad (1')$$

is satisfied.

Condition 1' stipulates that the surface 1', which is the surface of the barrier film on the side having the primer layer with respect to the barrier layer, satisfies a predetermined condition. When the barrier film is applied to a wavelength conversion sheet, a quantum dot-containing layer is positioned on the surface of the primer layer side of the barrier film. Because of this, it is considered that the surface of the primer layer side of the barrier film affects the performance of the quantum dot-containing layer. It is considered that, since the surface of the primer layer side of the barrier film satisfies condition 1', the barrier film of the present disclosure can give smaller influence when forming a quantum dot-containing layer on the barrier film, to thereby suppress in-plane uneven brightness of the wavelength conversion sheet. Hereinafter, condition 1' will be described more specifically.

Condition 1' is based on the premise that the surface 1', which is the surface of the barrier film on the side having the primer layer with respect to the barrier layer, has a predetermined irregularity.

It is considered that the irregularity on the surface 1' is generated in a step of forming a functional layer such as a barrier layer and a primer layer on the base material film and in a heating step after the above step.

It is considered that a first reason why the irregularity is generated by the above steps is the tension applied to the base material film in the flow direction when the functional layer is formed on the base material film. Specifically, it is considered that when the base material film is pulled with tension applied in the flow direction, a minute streak is generated in the flow direction, and this streak can act as a trigger for the irregularity. It is considered that a second reason why the irregularity is generated by the above steps is the shrinkage of a layer constituting the barrier film due to heating. Examples of a shrinkable layer include a functional layer such as a barrier layer and a base material film. Specifically, it is considered that the minute streak in the flow direction described above acts as a trigger, and that a peak and a valley are formed in the flow direction along the streak due to the shrinkage of the functional layer or the like. In the barrier film wound into a roll, peaks and valleys formed at the same positions in the width direction tend to gradually pile up so that the peaks and valleys on the surface side of the roll become larger. It is considered that by the above phenomenon, peaks extending in the flow direction and valleys extending in the flow direction are formed in the barrier film, and that irregularities are thus formed in a contour curve of the barrier film in the width direction.

It is considered that the irregularity on the surface 1' is generated by a combined factor of the first reason and the second reason, and it is considered that the irregularity is unlikely to be generated by the first reason or the second reason alone.

A minute streak that causes an irregularity on the surface 1' can be suppressed by adjusting a mechanical condition such as tension when producing a barrier film, and thus the irregularity on the surface 1' can be suppressed. However, even if a mechanical condition such as tension is adjusted, it is difficult to completely eliminate the minute streak, and thus it is difficult to completely eliminate the irregularity on the surface 1'. On the premise that an irregularity is generated on the surface 1' of the barrier film of the second embodiment, the present inventors have studied the conditions for making the uneven brightness less noticeable and arrived at condition 1'.

To the measurement method of condition 1', the measurement method of condition 1 of the barrier film of the first embodiment described above can be applied. Also, the preferable embodiment of the surface 1 of the barrier film of the first embodiment described above can be applied to a preferable embodiment of the surface 1'.

<Primer Layer>

In the barrier film of the second embodiment of the present disclosure, the position of the primer layer is preferably the outermost layer of the barrier film. The outermost layer means the outermost layer on the side having the primer layer with respect to the barrier layer. Having a primer layer at the position described above is preferable in view of improving the close adhesion between the barrier film and the quantum dot-containing layer.

Examples of an embodiment of the primer layer of the barrier film of the second embodiment include the same embodiments as those of the primer layer of the barrier film of the first embodiment described above.

<Base Material Film>

The barrier film of the second embodiment of the present disclosure has a base material film.

Examples of an embodiment of the base material film of the barrier film of the second embodiment include the same embodiments as those of the second base material film of the barrier film of the first embodiment described above.

<Barrier Layer>

In the barrier film of the second embodiment, the barrier layer can be formed, for example, between the base material film and the primer layer.

The barrier layer can be formed by, for example, vapor-depositing or applying the component for forming the barrier layer onto at least one of the base material film.

For the barrier film of the second embodiment, examples of the barrier layer include: a single layer of a single type selected from the group consisting of "an inorganic oxide layer formed by vapor-depositing an inorganic oxide," "an organic coating layer formed by applying a coating agent including a water-soluble polymer such as polyvinyl alcohol" and "a layer including a reaction product of a composition including a metal oxide and a phosphorus compound"; a layer obtained by laminating layers of a single type selected from the above group; and a layer obtained by laminating two or more layers selected from the above group. Among these, a laminate of an inorganic oxide layer and an organic coating layer is preferable. That is, the barrier layer preferably includes an inorganic oxide layer and an organic coating layer.

The inorganic oxide layer is preferably formed closer to the base material film than the organic coating layer. In other words, the barrier film of the second embodiment preferably has a base material film, an inorganic oxide layer, an organic coating layer, and a primer layer in presented order.

Examples of embodiments of the inorganic oxide layer and the organic coating layer of the barrier film of the second embodiment include the same embodiments as those of the inorganic oxide layer and the organic coating layer of the barrier film of the first embodiment described above.

<Other Layer>

The barrier film of the second embodiment may have "a layer other than the base material film, the barrier layer, and the primer layer (other layer)" as long as the other layer does not impair the effect of the barrier film.

Examples of the other layer include an anti-sticking layer. The anti-sticking layer is preferably positioned, for example, on the outermost layer on the side opposite to the side having the primer layer with respect to the barrier layer.

The anti-sticking layer preferably includes a filler and a binder resin. Examples of embodiments of the anti-sticking layer of the barrier film of the second embodiment include the same embodiments as those of the anti-sticking layer of the barrier film of the first embodiment described above.

[Wavelength Conversion Sheet]

The wavelength conversion sheet of the present disclosure is a wavelength conversion sheet comprising a first barrier film, a quantum dot-containing layer comprising a quantum dot, and a second barrier film laminated in presented order, wherein as at least one barrier film of the first barrier film and the second barrier film, the barrier film for a wavelength conversion sheet according to the present disclosure described above is laminated such that a surface of a side of the primer layer thereof faces a side of the quantum dot-containing layer.

FIG. 4 is a cross-sectional view showing one embodiment of the wavelength conversion sheet 200 of the present disclosure. In the wavelength conversion sheet 200 of FIG. 4, a first barrier film 100b, a quantum dot-containing layer 80 including a quantum dot, and a second barrier film 100a are laminated in presented order. In the wavelength conversion sheet 200 of FIG. 4, the first barrier film and the second barrier film are laminated such that surfaces of sides of the primer layers 10 thereof face a side of the quantum dot-containing layer 80.

The wavelength conversion sheet preferably has a vertically symmetrical layer configuration with the quantum dot-containing layer at the center, as shown in FIG. 4. In other words, it is preferable to use barrier films having the same configuration as the barrier films laminated on both sides of the quantum dot-containing layer. By having the above configuration, the strain can be evenly dispersed to easily improve the flatness of the wavelength conversion sheet, and the close adhesion of each interface of the wavelength conversion sheet can also be easily improved.

<Quantum Dot-Containing Layer>

The quantum dot-containing layer includes a quantum dot and a binder resin.

The quantum dot is a nanometer-sized fine particle of a semiconductor, exhibits a specific optical or electrical nature due to the quantum confinement effect (quantum size effect), the effect of confining an electron or an exciton in a small nanometer-sized crystal, and is also referred to as a semiconductor nanoparticle or a semiconductor nanocrystal.

The quantum dot is not particularly limited as long as it is a nanometer-sized fine particle of a semiconductor and is a material that generates the quantum confinement effect (quantum size effect). Examples of the quantum dot include a semiconductor fine particle whose emission color is regulated by its own particle size and a semiconductor fine particle having a dopant.

Quantum dots have different emission colors depending on the particle sizes thereof, and for example, in the case of quantum dots constituted only by a core made of CdSe, the peak wavelengths of fluorescence spectra when the particle sizes are 2.3 nm, 3.0 nm, 3.8 nm, and 4.6 nm are 528 nm, 570 nm, 592 nm, and 637 nm, respectively. That is, the particle size of the quantum dot that emits secondary light having a peak wavelength of 637 nm is 4.6 nm, and the particle size of the quantum dot that emits secondary light having a peak wavelength of 528 nm is 2.3 nm.

The quantum dots preferably include one or more selected from the group consisting of a quantum dot that emits secondary light having a wavelength corresponding to red and a quantum dot that emits secondary light having a wavelength corresponding to green, and more preferably include a quantum dot that emits secondary light having a wavelength corresponding to red and a quantum dot that emits secondary light having a wavelength corresponding to green. The quantum dots may contain a quantum dot other than the quantum dot that emits secondary light having a wavelength corresponding to red or the quantum dot that emits secondary light having a wavelength corresponding to green.

The quantum dot content is appropriately adjusted according to the thickness of the quantum dot-containing layer, the recycling rate of light in the backlight, the target color, or the like. When the thickness of the quantum dot-containing layer is in the range described later, the quantum dot content is preferably 0.010 parts by mass or more and 1.0 part by mass or less per 100 parts by mass of the binder resin of the quantum dot-containing layer.

Specific examples of a material that forms the core of the quantum dot include a semiconductor crystal containing a semiconductor compound or a semiconductor such as a group II-VI semiconductor compound such as MgS, MgSe, MgTe, CaS, CaSe, CaTe, SrS, SrSe, SrTe, BaS, BaSe, BaTe, ZnS, ZnSe, ZnTe, CdS, CdSe, CdTe, HgS, HgSe, and HgTe, a group III-V semiconductor compound such as AlN, AlP, AlAs, AlSb, GaAs, GaP, GaN, GaSb, InN, InAs, InP, InSb, TiN, TiP, TiAs, and TiSb, or a group IV semiconductor such as Si, Ge, and Pb. A semiconductor crystal including a semiconductor compound including three or more elements such as InGaP can also be used.

Further, as a quantum dot composed of a semiconductor fine particle having a dopant, a semiconductor crystal can be used that is formed by doping the above semiconductor compound with a cation of a rare earth metal or a cation of a transition metal, such as $Eu^{3+}$, $Tb^{3+}$, $Ag^+$, or $Cu^+$.

A semiconductor crystal such as CdS, CdSe, CdTe, InP, or InGaP is suitable as a material that forms the core of the quantum dot in view of ease of preparation, controllability of particle size that can provide light emission in the visible range, and fluorescence quantum yield.

The quantum dot may be made of one semiconductor compound or two or more semiconductor compounds, and for example, may have a core-shell type structure having a core made of a semiconductor compound and a shell made of a semiconductor compound different from that of the core.

When the core-shell type quantum dot is used, a material having a bandgap higher than that of the semiconductor compound that forms the core can be used as the semiconductor that forms the shell so that an exciton is confined in the core, whereby the light emission efficiency of the quantum dot can be enhanced.

Examples of the core-shell structure (core/shell) having such a bandgap magnitude relationship include CdSe/ZnS, CdSe/ZnSe, CdSe/CdS, CdTe/CdS, InP/ZnS, Gap/ZnS, Si/ZnS, InN/GaN, InP/CdSSe, InP/ZnSeTe, InGaP/ZnSe, InGaP/ZnS, Si/AlP, InP/ZnSTe, InGaP/ZnSTe, and InGaP/ZnSSe.

The size of the quantum dot may be appropriately controlled by the material that constitutes the quantum dot so that light having a desired wavelength can be obtained. As the particle size of the quantum dot decreases, the energy bandgap increases. Specifically, as the crystal size decreases, the light emission of the quantum dot shifts to the blue side, that is, to the high energy side. Accordingly, by changing the size of the quantum dot, the emission wavelength thereof can be regulated over the entire spectral wavelength region of the ultraviolet region, the visible region, and the infrared region.

In general, the particle size (diameter) of the quantum dot is preferably in the range of 0.5 nm or more and 20 nm or less and preferably in the range of 1 nm or more and 10 nm or less. A narrower size distribution of the quantum dot can provide a clearer emission color.

The shape of the quantum dot is not particularly limited, and may be, for example, a spherical shape, a rod shape, a disk shape, or any other shape. When the quantum dot is not in a spherical shape, the particle size of the quantum dot can be a value of a truly spherical shape having the same volume.

The quantum dot may be coated with a resin.

Examples of the binder resin of the quantum dot-containing layer include a thermoplastic resin, a cured product of a thermosetting resin composition, and a cured product of an ionizing radiation curable resin composition. Among these, in view of durability, a cured product of a thermosetting resin composition and a cured product of an ionizing radiation curable resin composition are preferable, and a cured product of an ionizing radiation curable resin composition is more preferable.

The thermosetting resin composition is a composition including at least a thermosetting resin, and is a resin composition that is cured by heating. The thermosetting resin composition includes preferably a thiol compound and more preferably a polyfunctional thiol compound, which are described later, in addition to the thermosetting resin.

Examples of the thermosetting resin include an acrylic resin, a urethane resin, a phenol resin, a urea melamine resin, an epoxy resin, an unsaturated polyester resin, and a silicone resin. In the thermosetting resin composition, a curing agent is added, as necessary, to these curable resins.

The ionizing radiation curable resin composition is a composition including a compound having an ionizing radiation curable functional group (hereinafter, also referred to as an "ionizing radiation curable compound"). The ionizing radiation curable resin composition includes preferably a thiol compound and more preferably a polyfunctional thiol compound, which are described later, in addition to the ionizing radiation curable compound.

Examples of the ionizing radiation curable functional group include an ethylenically unsaturated bond group such as a (meth)acryloyl group, a vinyl group, or an allyl group, an epoxy group, and an oxetanyl group, and among these, an ethylenically unsaturated bond group is preferable. Among the ethylenically unsaturated bond groups, a (meth)acryloyl group is preferable. Hereinafter, the ionizing radiation curable compound having a (meth)acryloyl group is referred to as a (meth)acrylate-based compound. That is, the binder resin preferably includes a cured product of a composition including a (meth)acrylate-based compound.

As used herein, "(meth)acrylate" refers to methacrylate and acrylate. As used herein, "ionizing radiation" means an electromagnetic wave or a charged particle beam having an energy quantum that can polymerize or crosslink a molecule among electromagnetic waves or a charged particle beams, and usually, an ultraviolet ray or an electron beam is used. An electromagnetic wave such as an X-ray or a γ-ray, and a charged particle beam such as an α-ray or an ion beam can also be used.

The ionizing radiation curable compound may be a monofunctional ionizing radiation curable compound having only one such functional group, a polyfunctional ionizing radiation curable compound having two or more such functional groups, or a mixture thereof. Among these, a polyfunctional ionizing radiation curable compound is preferable, and a polyfunctional (meth)acrylate-based compound having two or more (meth)acryloyl groups is more preferable. That is, the binder resin includes preferably a cured product of a polyfunctional ionizing radiation curable compound and more preferably a cured product of a polyfunctional (meth)acrylate-based compound. Further, the binder resin includes preferably a cured product of a composition including a polyfunctional ionizing radiation curable compound and a thiol compound and more preferably a cured product of a composition including a polyfunctional (meth)acrylate-based compound and a thiol compound.

The polyfunctional (meth)acrylate-based compound may have an alkyleneoxy group.

As the alkyleneoxy group, for example, an alkyleneoxy group having 2 or more to 4 or less carbon atoms is preferable, an alkyleneoxy group having 2 or 3 carbon atoms is more preferable, and an alkyleneoxy group having 2 carbon atoms is further preferable.

The polyfunctional (meth)acrylate-based compound having an alkyleneoxy group may be a polyfunctional (meth)acrylate-based compound having a polyalkyleneoxy group including a plurality of alkyleneoxy groups.

When the polyfunctional (meth)acrylate-based compound has an alkyleneoxy group, the number of alkyleneoxy groups in one molecule is preferably 2 or more and 30 or less, and more preferably 2 or more and 20 or less, further preferably 3 or more and 10 or less, and more further preferably 3 or more and 5 or less.

When the polyfunctional (meth)acrylate-based compound has an alkyleneoxy group, the compound preferably has a bisphenol structure. This tends to improve the heat resistance of the cured product. Examples of the bisphenol structure include a bisphenol A structure and a bisphenol F structure, and among these, a bisphenol A structure is preferable.

As the polyfunctional (meth)acrylate-based compound having an alkyleneoxy group, above all, ethoxylated bisphenol A type di(meth)acrylate, propoxylated bisphenol A type di(meth)acrylate, and propoxylated ethoxylated bisphenol A type di(meth)acrylate are preferable, and ethoxylated bisphenol A type di(meth)acrylate is more preferable.

The ionizing radiation curable compound may be a monomer, an oligomer, a low molecular weight polymer, or a mixture thereof.

As described above, the thermosetting resin composition and the ionizing radiation curable resin composition preferably include a thiol compound.

The thiol compound is a compound having one or more units represented by R—SH wherein R is an organic group. As used herein, a compound having one unit represented by R—SH is referred to as a monofunctional thiol compound, and a compound having two or more units represented by R—SH is referred to as a polyfunctional thiol compound.

The thiol compound may be a monofunctional thiol compound, but a polyfunctional thiol compound is preferable in view of improving the strength of the quantum dot-containing layer. Among the polyfunctional thiol compounds, a trifunctional thiol compound or a tetrafunctional thiol compound is more preferable.

The thiol compound causes a thiol-ene reaction of the following equation with a compound having a radically polymerizable functional group in the presence of a radical polymerization initiator. The thiol-ene reaction is preferable in the following: because the thiol-ene reaction can suppress polymerization shrinkage, the stress generated at the time of curing the quantum dot-containing layer is relaxed, and as a result, the interlayer close adhesion of the wavelength conversion sheet is easily further improved. In addition, the cured product obtained by the thiol-ene reaction is preferable in that the heat resistance is easily improved. Further, the refractive index of the thiol compound (about 1.53) is higher than the refractive index of the polyfunctional (meth) acrylate-based compound (about 1.45), and thus the degree of freedom in adjusting the refractive index of the quantum dot-containing layer can be increased.

The following reaction is an example of a reaction between a monofunctional thiol compound and a compound having one radically polymerizable functional group. It is considered that the reaction product of a polyfunctional thiol compound and a compound having two or more radically polymerizable functional groups easily forms a dendrimer structure. Then, it is considered that when the dendrimer structure is formed, the flexibility of the quantum dot-containing layer increases, and that the quantum dot-containing layer itself easily exerts an excellent stress relaxation property. Examples of the radically polymerizable functional group include an ethylenically unsaturated bond-containing group such as a (meth)acryloyl group, a vinyl group, or an allyl group.

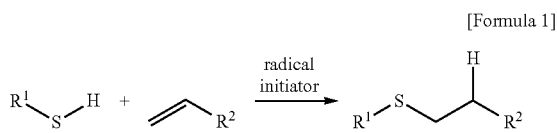

[Formula 1]

wherein $R^1$ and $R^2$ are organic groups.

Specific examples of the monofunctional thiol compound include hexanethiol, 1-heptanethiol, 1-octanethiol, 1-nonanethiol, 1-decanethiol, 3-mercaptopropionic acid, methyl mercaptopropionate, methoxybutyl mercaptopropionate, octyl mercaptopropionate, tridecyl mercaptopropionate, 2-ethylhexyl-3-mercaptopropionate, and n-octyl-3-mercaptopropionate.

Specific examples of the polyfunctional thiol compound include ethylene glycol bis(3-mercaptopropionate), diethylene glycol bis(3-mercaptopropionate), tetraethylene glycol bis(3-mercaptopropionate), 1,2-propylene glycol bis(3-mercaptopropionate), diethylene glycol bis(3-mercaptobutyrate), 1,4-butanediol bis(3-mercaptopropionate), 1,4-butanediol bis(3-mercaptobutyrate), 1,8-octanediol bis(3-mercaptopropionate), 1,8-octanediol bis(3-mercaptobutyrate), hexanediol bisthioglycolate, trimethylolpropane tris(3-mercaptopropionate), trimethylolpropane tris(3-mercaptobutyrate), trimethylolpropane tris(3-mercaptoisobutyrate), trimethylolpropane tris(2-mercaptoisobutyrate), trimethylolpropane tristhioglycolate, tris-[(3-mercaptopropionyloxy)-ethyl]-isocyanurate, trimethylolethane tris(3-mercaptobutyrate), pentaerythritol tetrakis (3-mercaptopropionate), pentaerythritol tetrakis(3-mercaptobutyrate), pentaerythritol tetrakis(3-mercaptoisobutyrate), pentaerythritol tetrakis(2-mercaptoisobutyrate), dipentaerythritol hexakis(3-mercaptopropionate), dipentaerythritol hexakis(2-mercaptopropionate), dipentaerythritol hexakis(3-mercaptobutyrate), dipentaerythritol hexakis(3-mercaptoisobutyrate), dipentaerythritol hexakis(2-mercaptoisobutyrate), pentaerythritol tetrakisthioglycolate, and dipentaerythritol hexakisthioglycolate.

In the ionizing radiation curable resin composition (or thermosetting resin resin composition), the mass ratio of the ionizing radiation curable compound (or thermosetting resin) and the thiol compound is preferably 80:20 to 35:65 and more preferably 70:30 to 40:60.

When the ionizing radiation curable compound is an ultraviolet curable compound, the ionizing radiation curable composition preferably includes an additive such as a photopolymerization initiator or a photopolymerization accelerator.

The quantum dot-containing layer may include an internal diffusion particle.

As the internal diffusion particle, either of an organic particle and an inorganic particle can be used. Examples of the organic particle include a particle made of polymethyl methacrylate, an acrylic-styrene copolymer, a melamine resin, a polycarbonate, a polystyrene, polyvinyl chloride, a benzoguanamine-melamine-formaldehyde condensate, a silicone resin, a fluororesin, a polyester, or the like. Examples of the inorganic fine particle include a fine particle made of silica, alumina, zirconia, titania, or the like.

Examples of the shape of the internal diffusion particle include a spherical shape, a disk shape, a rugby ball shape, and an irregular shape. The internal diffusion particle may be any of a hollow particle, a porous particle, and a solid particle.

The content of the internal diffusion particle is preferably 1 part by mass or more and 40 parts by mass or less and more preferably 3 parts by mass or more and 30 parts by mass or less per 100 parts by mass of the binder resin.

The average particle size of the internal diffusion particle is preferably 1 μm or more and 7 μm or less and more preferably 1 μm or more and 3 μm or less.

The thickness of the quantum dot-containing layer is preferably 10 μm or more and 200 μm or less, more preferably 20 μm or more and 150 μm or less, further preferably 30 μm or more and 100 μm or less, and more further preferably 40 μm or more and 90 μm or less.

The smaller the thickness of the quantum dot-containing layer, the greater the influence of the irregularity on the surface 1 of the barrier film tends to be. Since the barrier film of the wavelength conversion sheet of the present disclosure satisfies condition 1, it is possible to easily suppress the occurrence of in-plane uneven brightness of the wavelength conversion sheet, even if the thickness of the quantum dot-containing layer is in the above range.

[Backlight]

The backlight of the present disclosure is a backlight including: at least one light source that emits primary light; an optical plate that is disposed adjacent to the light source and is for light guiding or diffusion; and a wavelength conversion sheet disposed on a light going-out side of the optical plate, wherein the wavelength conversion sheet is the wavelength conversion sheet of the present disclosure described above.

Examples of a backlight 300 of the present disclosure include an edge-lit type backlight 301 as shown in FIG. 5 and a direct-lit type backlight 302 as shown in FIG. 6.

An optical plate 220 used for the edge-lit type backlight 301 in FIG. 5 is an optical member for guiding primary light emitted by a light source 210, and is a so-called light guide plate 221. The light guide plate 221 has, for example, a substantially flat plate shape configured to have at least one surface as a light coming-in surface and one surface substantially orthogonal to the light coming-in surface as a light going-out surface.

The light guide plate is mainly made of a matrix resin selected from the group consisting of a highly transparent resin such as polymethyl methacrylate. A resin particle having a refractive index different from that of the matrix resin may be added, as necessary, to the light guide plate. Each surface of the light guide plate may have a complicated surface shape instead of a uniform flat surface, and may be provided with a dot pattern or the like.

The optical plate 220 used for the direct-lit type backlight 302 of FIG. 6 is an optical member (light diffusing plate 222) having a light diffusing property for making the pattern of the light source 210 less visible. Examples of the light diffusing plate 222 include a milky white resin plate having a thickness of 1 mm or more and 3 mm or less.

In addition to the light source, the optical plate, and the barrier film described above, the edge-lit type and direct-lit type backlights may include one or more members selected from the group consisting of a reflector, a light diffusing film, a prism sheet, a brightness enhancement film (BEF), a reflective polarizing film (DBEF), and the like, depending on the purpose.

The reflector is disposed on the opposite side of the optical plate from the light going-out surface side. The light diffusing film, the prism sheet, the brightness enhancement film, and the reflective polarizing film are disposed on the light going-out surface side of the optical plate. A backlight having an excellent balance of front brightness, viewing angle, and the like can be provided when the backlight is configured to include one or more members selected from the group consisting of a reflector, a light diffusing film, a prism sheet, a brightness enhancement film, a reflective polarizing film, and the like.

In the edge-lit type and direct-lit type backlights, the light source 210 is a light emitting body that emits primary light, and it is preferable to use a light emitting body that emits primary light having a wavelength corresponding to blue. The primary light having a wavelength corresponding to blue preferably has a peak wavelength in the range of 380 nm or more and 480 nm or less. The peak wavelength range is more preferably 450 nm±7 nm, more preferably 450 nm±5 nm, more preferably 450 nm±3 nm, and more preferably 450 nm±1 nm.

The light source 210 is preferably an LED light source and more preferably a blue monochromatic LED light source, in view of simplifying and downsizing the apparatus in which the backlight is installed. The number of the light source 210 is at least one, and it is preferable to provide a plurality thereof in view of emitting sufficient primary light.

[Liquid Crystal Display Apparatus]

The liquid crystal display apparatus of the present disclosure is a liquid crystal display apparatus including a backlight and a liquid crystal panel, wherein the backlight is the backlight of the present disclosure described above.

The liquid crystal panel is not particularly limited, and a general-purpose liquid crystal panel can be used as the liquid crystal panel of the liquid crystal display apparatus. For example, a liquid crystal panel having a general structure can be used in which the liquid crystal layer is sandwiched between glass plates on the upper side and the lower side, respectively, thereof, specifically, a liquid crystal panel using a display mode such as TN, STN, VA, IPS, and OCB.

The liquid crystal display apparatus further includes a polarizing plate, a color filter, and the like. A general-purpose polarizing plate and color filter can be used.

The display image of the liquid crystal display apparatus is displayed in color by the white light emitted from the backlight penetrating the color filter. The liquid crystal display apparatus, in which a color filter that matches the spectrum of a backlight using a quantum dot is used, can realize a display that is excellent in brightness and efficiency and produces a very clear color.

[Method for Selecting Barrier Film for Wavelength Conversion Sheet According to First Embodiment]

The method for selecting the barrier film for a wavelength conversion sheet according to the first embodiment of the present disclosure is a method for selecting a barrier film for a wavelength conversion sheet, the barrier film comprising a first base material film, a second base material film, a barrier layer, a primer layer, and an adhesive layer positioned between the first base material film and the second base material film, wherein a requirement for selecting is to satisfy the following condition 1:

<Condition 1>

A surface of the barrier film on a side having the primer layer with respect to the adhesive layer is defined as a surface 1; an elevation of the surface 1 is measured at intervals of 1 mm to obtain elevation data about the surface 1; a contour curve of the surface 1 determined by the elevation data is defined as a contour curve 1; at least a part of the surface 1 comprises at least one or more irregularity 1 having a height difference between an adjacent peak and valley of 0.001 mm or more and 0.600 mm or less in the contour curve 1 in a predetermined direction; when a height difference and a width of the irregularity 1 are defined as H [mm] and W [mm], respectively, the following expression (1):

$$H/W^2 \le 1.5 \times 10^{-5} \tag{1}$$

is satisfied.

Selecting a barrier film that satisfies condition 1 makes it possible to efficiently select a barrier film for a wavelength conversion sheet that can suppress in-plane uneven brightness of the wavelength conversion sheet.

To preferable embodiments of the barrier film in the method for selecting the barrier film of the first embodiment of the present disclosure, the preferable embodiments of the barrier film of the first embodiment of the present disclosure described above can be applied. For example, the barrier film preferably has the second base material film, the adhesive layer, the first base material film, the barrier layer, and the primer layer in presented order. When the thickness of the first base material film and the thickness of the second base material film are defined as T1 and T2, respectively, it is preferable that T1<T2 in the barrier film.

[Method for Selecting Barrier Film for Wavelength Conversion Sheet According to Second Embodiment]

The method for selecting the barrier film for a wavelength conversion sheet according to the second embodiment of the present disclosure is a method for selecting a barrier film for a wavelength conversion sheet, the barrier film comprising a base material film, a barrier layer, and a primer layer in presented order, wherein a requirement for selecting is to satisfy the following condition 1':

<Condition 1'>

A surface of the barrier film on a side having the primer layer with respect to the barrier layer is defined as a surface 1'; an elevation of the surface 1' is measured at intervals of 1 mm to obtain elevation data about the surface 1'; a contour curve of the surface 1' determined by the elevation data is defined as a contour curve 1'; at least a part of the surface 1' comprises at least one or more irregularity 1' having a height difference between an adjacent peak and valley of 0.001 mm or more and 0.600 mm or less in the contour curve 1' in a predetermined direction; when a height difference and a width of the irregularity 1' are defined as H [mm] and W [mm], respectively, the following expression (1'):

$$H/W^2 \leq 1.5 \times 10^{-5} \qquad (1')$$

is satisfied.

Selecting a barrier film that satisfies condition 1' makes it possible to efficiently select a barrier film for a wavelength conversion sheet that can suppress in-plane uneven brightness of the wavelength conversion sheet.

To preferable embodiments of the barrier film in the method for selecting the barrier film of the second embodiment of the present disclosure, the preferable embodiments of the barrier film of the second embodiment of the present disclosure described above can be applied.

EXAMPLES

Next, the present disclosure will be described in more detail with reference to Examples, but the present disclosure is not limited to these Examples at all. "Parts" and "%" are by mass unless otherwise specified.

1. Measurements and Evaluations

The following measurements and evaluations of the barrier films or wavelength conversion sheets of Examples and Comparative Examples were carried out. Results thereof are shown in Table 1.

1-1. Measurement of Irregularity on Surface 1

The elevation of the surface 1, which was the surface of a barrier film 1 of each of Examples and Comparative Examples on a side having the primer layer, was measured. As a measuring apparatus, a trade name "LINE STRIPER [HIU-LS400]" manufactured by Hakko Automation Co., Ltd. was used.

In a contour curve 1 in the width direction of the surface 1, a region having an irregularity 1 having a height difference between an adjacent peak and valley of 0.001 mm or more and 0.600 mm or less was extracted. The height difference H [mm] of the irregularity 1 and the width W [mm] of the irregularity 1 were calculated from the contour curve 1 in the width direction passing through the center of the region in the flow direction. When a plurality of irregularities 1 were present, the height difference H [mm] and the width W [mm] were calculated for each of the irregularities 1. Then, H/W² was calculated for each of the irregularities 1. In FIG. 8, D1 represents the flow direction, D2 represents the width direction, A1 represents a region having an irregularity 1, and S1 represents the direction of the contour curve 1 in the width direction passing through the center of the region having an irregularity 1 in the flow direction.

When measuring the elevation with the above measuring apparatus, the following measurement conditions were adopted.

<Measurement Conditions>
 Measurement region: 200 mm×200 mm
 Curvature (angle) range: 0.8/m (deg)
 Offset: 0.00/m (deg)
 Simple displacement range: 0.01 mm
 Offset: 0.00 mm
 Simple displacement approximation order: 6
 Smoothing (line width): 1.0 mm
 Smoothing (line): 5.0 mm
 Smoothing (travel direction): 3.0 mm
 Differential width: 10.0 mm
 Image processing mode: Standard 1-2. Uneven Brightness A commercially available liquid crystal display television (manufactured by VIZIO, Inc., PQ65-F1) equipped with a direct-lit type backlight was disassembled, and the direct-lit type backlight was taken out. The direct-lit type backlight is equipped with a direct-lit type blue LED having an emission central wavelength of 450 nm and a full width at half maximum of 20 nm as a light source. In addition, on the light going-out side of the light source, a light diffusing plate, a wavelength conversion sheet including a quantum dot-containing layer, a prism sheet, and a reflective polarizing plate (brightness enhancement film, manufactured by 3M, DBEF (registered trademark)) are disposed in presented order. In addition, a reflective sheet is provided on the opposite side of the light source from the light going-out side.

The wavelength conversion sheet in the direct-lit type backlight was changed to each of the wavelength conversion sheets of the Examples and the Comparative Examples to obtain a direct-lit type backlight for evaluation of uneven brightness. Each of the wavelength conversion sheets of the Examples and the Comparative Examples was exposed to an atmosphere having a temperature of 23° C.±5° C. and a relative humidity of 40% or more and 65% or less for 30 minutes or more before being incorporated into the direct-lit type backlight.

The direct-lit type backlight for evaluation of uneven brightness was turned on, and in-plane uneven brightness of the direct-lit type backlight was visually observed from the front direction at a distance of 500 mm in a darkroom environment and evaluated according to the following criteria. Evaluators were healthy people in their thirties having a visual acuity of 0.8 or more.

A: Uneven brightness is not visually recognized even by careful observation.
 B: Uneven brightness is visually recognized by careful observation, but it cannot be deemed that the uneven brightness is noticeable.
 C: Uneven brightness is clearly noticeable.

2. Preparation of Quantum Dot Dispersion Liquid

A quantum dot and amino-modified silicone were mixed at the composition ratio shown below in a glove box purged with nitrogen such that the oxygen concentration was 300 ppm or less, and the resulting mixture was stirred using a magnetic stirrer for 4 hours while heated in a water bath at 90° C. Thereafter, the mixture was filtered through a polypropylene filter having a pore size of 0.2 µm to obtain a CdSe/ZnS core-shell type quantum dot dispersion liquid.

Quantum dot 0.9 parts by mass
 (Emission peak: 540 nm, serial number: 748056, manufactured by Sigma-Aldrich Corporation)
 Quantum dot 0.9 parts by mass
 (Emission peak: 630 nm, serial number: 790206, manufactured by Sigma-Aldrich Corporation)
 Amino-modified silicone 99 parts by mass
 (Manufactured by Genesee Polymers Corporation, product number: GP-344, viscosity: 670 mPa·s)

3. Preparation of Barrier Film and Preparation of Wavelength Conversion Sheet

Example 1

Aluminum oxide was vapor-deposited on one surface of a first base material film (biaxially stretched PET film, thickness: 12 µm) by a vacuum vapor deposition method to form an inorganic oxide layer having a thickness of 10 nm.

Next, the following coating liquid for an organic coating layer was applied onto the inorganic oxide layer by gravure printing, and heat-treated at 90° C. for 60 seconds to form an organic coating layer having a thickness of 400 nm.

Next, the following coating liquid for a primer layer was applied by gravure printing onto the surface of the opposite side of the first base material film from the surface on which the inorganic oxide layer had been formed, and heat-treated at 80° C. for 60 seconds to form a primer layer (thickness: 215 nm), thereby obtaining a laminated body A having the primer layer, the first base material film, the inorganic oxide layer, and the organic coating layer in presented order.

Next, a composition for a two-component curable polyurethane-based adhesive layer containing an isocyanate-based curing agent was applied onto one surface of a second base material film (biaxially stretched PET film, thickness: 100 µm) by gravure printing and dried at 80° C. for 60 seconds to form an adhesive layer having a thickness of 6 µm, thereby obtaining a laminated body B having the adhesive layer on the second base material film.

Next, while applying tension to the laminated body A and the laminated body B, the surface of the adhesive layer side of the laminated body B is superposed on the surface of the organic coating layer side of the laminated body A, and the laminated body A and the laminated body B were dry-laminated to obtain a laminated body C. The laminated body C was wound into a roll (winding length: 600 m).

Next, the laminated body C was aged at 40° C. for 72 hours.

A 200 mm×300 mm sheet was cut out from a region within 2 m from the surface side of the laminated body C in the form of a roll after aging to obtain a barrier film of Example 1.

Through the above operations, the barrier film 1 of Example 1 having the second base material film, the adhesive layer, the first base material film, the inorganic oxide layer, the organic coating layer, and the primer layer in presented order was obtained.

As another barrier film used for the wavelength conversion sheet, a barrier film 2 was provided by cutting out a 200 mm×300 mm sheet from the core side of the laminated body C in the form of a roll. The barrier film 2 does not have an irregularity having a height difference of 0.001 mm or more on a surface 1.

<Preparation of Coating Liquid for Organic Coating Layer>

Tetraethoxysilane was mixed into a solution (pH 2.2) obtained by mixing water, isopropyl alcohol, and 0.5 N hydrochloric acid, while cooling the same to 10° C., to thereby prepare solution A. Separately, polyvinyl alcohol and isopropyl alcohol having a saponification value of 99% or more were mixed to thereby prepare solution B. Solution A and solution B were mixed to prepare a coating liquid for organic coating layer (solid content: 5% by mass). The mass ratio of tetraethoxysilane to polyvinyl alcohol in the coating liquid for organic coating layer is 29:4.

| <Coating liquid for primer layer> | |
|---|---|
| Polyester polyurethane polyol (Hydroxyl value: 62 mgKOH/g, solid content: 20% by mass) | 50 parts by mass |
| Silane coupling agent (3-Glycidoxypropylmethyldimethoxysilane) | 1 part by mass |

| <Coating liquid for primer layer> | |
|---|---|
| Silica filler (Average particle size 5 µm) | 1 part by mass |
| Curing agent (1,6-Hexamethylene diisocyanate, solid content 35%) | 1 part by mass |
| Solvent (Methyl ethyl ketone) | 50 parts by mass |

A coating liquid for a quantum dot-containing layer having the following formulation was applied onto the surface of the primer layer side of the barrier film 1 to form a quantum dot-containing layer not irradiated with ionizing radiation, thereby obtaining a laminated body D.

Next, the laminated body D and the barrier film 2 were laminated such that the surface of the side of the quantum dot-containing layer not irradiated with ionizing radiation of the laminated body D and the surface of the primer layer side of the barrier film 2 prepared above faced each other, and the resultant was then irradiated with an ultraviolet ray (irradiation dose: 1000 mJ/cm$^2$) to allow the curing of the ionizing radiation curable resin composition of the quantum dot-containing layer to proceed, thereby obtaining a wavelength conversion sheet of Example 1. The thickness of the quantum dot-containing layer is 100 µm.

The wavelength conversion sheet of Example 1 has the second base material film, the adhesive layer, the first base material film, the inorganic oxide layer, the organic coating layer, the primer layer, the quantum dot-containing layer, the primer layer, the organic coating layer, the inorganic oxide layer, the first base material film, the adhesive layer, and the second base material film in presented order.

| <Coating liquid for quantum dot-containing layer> | |
|---|---|
| Polyfunctional acrylate-based compound (Ethoxylated bisphenol A diacrylate; trade name "ABE-300" of Shin-Nakamura Chemical Co., Ltd.) | 58.11 parts by mass |
| Polyfunctional thiol compound (Pentaerythritol tetrakis(3-mercaptopropionate); trade name "PEMP" of SC Organic Chemical Co., Ltd.) | 38.74 parts by mass |
| Photopolymerization initiator (Trade name "Omnirad TPO H" of IGM Resins B.V.) | 0.5 parts by mass |
| Quantum dot dispersion liquid prepared in "2" above | 1.61 parts by mass |
| Acetic acid | 0.79 parts by mass |
| Titanium oxide (Trade name "Ti-Pure R-706" of The Chemours company; particle size 0.36 µm) | 0.25 parts by mass |

Example 2

A barrier film 1, a barrier film 2, and a wavelength conversion sheet of Example 2 were obtained in the same manner as in Example 1, except that the following conditions were changed.

<Changed Conditions>
The second base material film was changed to a biaxially stretched PET film having a thickness of 50 µm.
The tension applied to the laminated body A and the laminated body B when obtaining the laminated body C is lower by 30% than the tension in Example 1.
The winding length of the laminated body C was 1.5 times that in Example 1

Example 3

A barrier film 1, a barrier film 2, and a wavelength conversion sheet of Example 3 were obtained in the same manner as in Example 1, except that the following conditions were changed.
<Changed Conditions>
  The second base material film was changed to a biaxially stretched PET film having a thickness of 50 μm.
  The tension applied to the laminated body A and the laminated body B when obtaining the laminated body C is lower by 30% than the tension in Example 1.

Comparative Example 1

A barrier film 1, a barrier film 2, and a wavelength conversion sheet of Comparative Example 1 were obtained in the same manner as in Example 1, except that the following condition was changed.
<Changed Condition>
  The tension applied to the laminated body A and the laminated body B when obtaining the laminated body C is higher by 20% than the tension in Example 1.

Comparative Example 2

A barrier film 1, a barrier film 2, and a wavelength conversion sheet of Comparative Example 2 were obtained in the same manner as in Example 1, except that the following conditions were changed.
<Changed Conditions>
  The tension applied to the laminated body A and the laminated body B when obtaining the laminated body C is higher by 20% than the tension in Example 1.
  The winding length of the laminated body C was 1.5 times that in Example 1

Comparative Example 3

A barrier film 1, a barrier film 2, and a wavelength conversion sheet of Comparative Example 3 were obtained in the same manner as in Example 1, except that the following conditions were changed.
<Changed Conditions>
  The second base material film was changed to a biaxially stretched PET film having a thickness of 50 μm.
  The tension applied to the laminated body A and the laminated body B when obtaining the laminated body C is lower by 20% than the tension in Example 1.

Comparative Example 4

A barrier film 1, a barrier film 2, and a wavelength conversion sheet of Comparative Example 4 were obtained in the same manner as in Example 1, except that the following conditions were changed.
<Changed Conditions>
  The second base material film was changed to a biaxially stretched PET film having a thickness of 50 μm.
  The tension applied to the laminated body A and the laminated body B when obtaining the laminated body C is lower by 20% than the tension in Example 1.
  The winding length of the laminated body C was 1.5 times that in Example 1

TABLE 1

| | First irregularity 1 | | | | Second irregularity 1 | | | | Third irregularity 1 | | | | Uneven bright-ness |
|---|---|---|---|---|---|---|---|---|---|---|---|---|---|
| | H[mm] | W[mm] | $H/W^2$ $(\times 10^{-5})$ | Condition 1 | H[mm] | W[mm] | $H/W^2$ $[\times 10^{-5}]$ | Condition 1 | H[mm] | W[mm] | $H/W^2$ $[\times 10^{-5}]$ | Condition 1 | |
| Example 1 | 0.0021 | 23 | 0.40 | Yes | 0.0021 | 24 | 0.36 | Yes | 0.0019 | 27 | 0.26 | Yes | A |
| Example 2 | 0.0071 | 24 | 1.23 | Yes | 0.0071 | 28 | 0.91 | Yes | 0.0071 | 27 | 0.97 | Yes | A |
| Example 3 | 0.0035 | 19 | 0.97 | Yes | 0.0032 | 20 | 0.80 | Yes | 0.0020 | 16 | 0.78 | Yes | A |
| Comparative Example 1 | 0.0037 | 15 | 1.64 | No | 0.0053 | 15 | 2.36 | No | 0.0053 | 16 | 2.07 | No | C |
| Comparative Example 2 | 0.0053 | 14 | 2.70 | No | 0.0068 | 17 | 2.35 | No | 0.0068 | 16 | 2.66 | No | C |
| Comparative Example 3 | 0.0051 | 18 | 1.57 | No | 0.0051 | 16 | 1.99 | No | 0.0039 | 15 | 1.73 | No | C |
| Comparative Example 4 | 0.0075 | 18 | 2.31 | No | 0.0080 | 24 | 1.39 | Yes | 0.0083 | 24 | 1.44 | Yes | C |

From Table 1, it can be confirmed that the barrier films of Examples 1 to 3, which satisfy condition 1, can suppress in-plane uneven brightness of the wavelength conversion sheet.

In the above 1-1, a region having an irregularity 1 having a height difference of 0.001 mm or more and 0.600 mm or less was extracted, and then $H/W^2$ was calculated from the contour curve 1 in the width direction passing through the center of the above-described region in the flow direction. Although not shown in Table 1, the barrier films of the Examples satisfied condition 1 even in a contour curve 1 in the width direction passing through an area that did not correspond to the center of the above-descried region in the flow direction.

In addition, the barrier films of the Examples and the Comparative Examples did not have an irregularity having a height difference of more than 0.600 mm on the surface 1.

REFERENCE SIGNS LIST

10: Primer layer
20: Barrier layer
21: First barrier layer
22: Second barrier layer
30: First base material film
40: Adhesive layer
50: Second base material film 80: Quantum dot-containing layer
100: Barrier film for wavelength conversion sheet
100a: Second barrier film
100b: First barrier film
200: Wavelength conversion sheet
210: Light source
220: Optical plate
221: Light guide plate
222: Diffusing plate
230: Reflector
240: Prism sheet
300: Backlight
301: Edge-lit type backlight
302: Direct-lit type backlight

The invention claimed is:

1. A barrier film for a wavelength conversion sheet, the barrier film comprising a first base material film, a second base material film, a barrier layer, a primer layer, and an adhesive layer positioned between the first base material film and the second base material film, wherein
the barrier film satisfies the following condition 1:
<Condition 1>
A surface of the barrier film on a side having the primer layer with respect to the adhesive layer is defined as a surface 1; an elevation of the surface 1 is measured at intervals of 1 mm to obtain elevation data about the surface 1; a contour curve of the surface 1 determined by the elevation data is defined as a contour curve 1; at least a part of the surface 1 comprises at least one or more irregularity 1 having a height difference between an adjacent peak and valley of 0.001 mm or more and 0.600 mm or less in the contour curve 1 in a predetermined direction; when a height difference and a width of the irregularity 1 are defined as H [mm] and W [mm], respectively, the following expression (1):

$$H/W^2 \leq 1.5 \times 10^{-5} \qquad (1)$$

is satisfied.

2. The barrier film for a wavelength conversion sheet according to claim 1, wherein in the condition 1, $H/W^2$ in the expression (1) is $0.1 \times 10^{-5}$ or more and $1.5 \times 10^{-5}$ or less.

3. The barrier film for a wavelength conversion sheet according to claim 1, wherein the barrier film comprises the second base material film, the adhesive layer, the first base material film, the barrier layer, and the primer layer in presented order.

4. The barrier film for a wavelength conversion sheet according to claim 1, wherein the barrier film comprises the second base material film, the adhesive layer, the barrier layer, the first base material film, and the primer layer in presented order.

5. The barrier film for a wavelength conversion sheet according to claim 3, wherein the barrier film comprises an anti-sticking layer on an opposite side of the second base material film from the adhesive layer.

6. The barrier film for a wavelength conversion sheet according to claim 1, wherein when a thickness of the first base material film and a thickness of the second base material film are defined as T1 and T2, respectively, T1<T2.

7. The barrier film for a wavelength conversion sheet according to claim 6, wherein T2/T1 is 2.0 or more and 10.0 or less.

8. The barrier film for a wavelength conversion sheet according to claim 1, wherein when a thickness of the first base material film is defined as T1, T1 is 5 μm or more and 100 μm or less.

9. The barrier film for a wavelength conversion sheet according to claim 1, wherein when a thickness of the second base material film is defined as T2, T2 is 10 μm or more and 200 μm or less.

10. The barrier film for a wavelength conversion sheet according to claim 1, wherein the barrier layer comprises an inorganic oxide layer and an organic coating layer.

11. The barrier film for a wavelength conversion sheet according to claim 1, wherein the adhesive layer comprises a cured product of a composition for an adhesive layer comprising an isocyanate-based curing agent.

12. The barrier film for a wavelength conversion sheet according to claim 1, wherein a ratio of a total light transmittance of a region not having the irregularity 1 to a total light transmittance of a region having the irregularity 1 is 0.95 or more and 1.05 or less.

13. A barrier film for a wavelength conversion sheet, the barrier film comprising a base material film, a barrier layer, and a primer layer in presented order, wherein
the barrier film satisfies the following condition 1':
<Condition 1'>
A surface of the barrier film on a side having the primer layer with respect to the barrier layer is defined as a surface 1'; an elevation of the surface 1' is measured at intervals of 1 mm to obtain elevation data about the surface 1'; a contour curve of the surface 1' determined by the elevation data is defined as a contour curve 1'; at least a part of the surface 1' comprises at least one or more irregularity 1' having a height difference between an adjacent peak and valley of 0.001 mm or more and 0.600 mm or less in the contour curve 1' in a predetermined direction; when a height difference and a width of the irregularity 1' are defined as H [mm] and W [mm], respectively, the following expression (1'):

$$H/W^2 \leq 1.5 \times 10^{-5} \qquad (1')$$

is satisfied.

14. A wavelength conversion sheet comprising a first barrier film, a quantum dot-containing layer comprising a quantum dot, and a second barrier film laminated in presented order, wherein as at least one barrier film of the first barrier film and the second barrier film, the barrier film for a wavelength conversion sheet according to claim 1 is laminated such that a surface of a side of the primer layer thereof faces a side of the quantum dot-containing layer.

15. The wavelength conversion sheet according to claim 14, wherein a thickness of the quantum dot-containing layer is 10 μm or more and 200 μm or less.

16. A backlight comprising: at least one light source that emits primary light; an optical plate that is disposed adjacent to the light source and is for light guiding or diffusion; and a wavelength conversion sheet disposed on a light going-out side of the optical plate, wherein the wavelength conversion sheet is the wavelength conversion sheet according to claim 14.

17. A liquid crystal display apparatus comprising a backlight and a liquid crystal panel, wherein the backlight is the backlight according to claim 16.

18. A method for selecting a barrier film for a wavelength conversion sheet, the barrier film comprising a first base material film, a second base material film, a barrier layer, a primer layer, and an adhesive layer positioned between the first base material film and the second base material film, wherein a requirement for selecting is to satisfy the following condition 1:

<Condition 1>

A surface of the barrier film on a side having the primer layer with respect to the adhesive layer is defined as a surface 1; an elevation of the surface 1 is measured at intervals of 1 mm to obtain elevation data about the surface 1; a contour curve of the surface 1 determined by the elevation data is defined as a contour curve 1; at least a part of the surface 1 comprises at least one or more irregularity 1 having a height difference between an adjacent peak and valley of 0.001 mm or more and 0.600 mm or less in the contour curve 1 in a predetermined direction; when a height difference and a width of the irregularity 1 are defined as H [mm] and W [mm], respectively, the following expression (1):

$$H/W^2 \leq 1.5 \times 10^{-5} \tag{1}$$

is satisfied.

19. A method for selecting a barrier film for a wavelength conversion sheet, the barrier film comprising a base material film, a barrier layer, and a primer layer in presented order, wherein a requirement for selecting is to satisfy the following condition 1':

<Condition 1'>

A surface of the barrier film on a side having the primer layer with respect to the barrier layer is defined as a surface 1'; an elevation of the surface 1' is measured at intervals of 1 mm to obtain elevation data about the surface 1'; a contour curve of the surface 1' determined by the elevation data is defined as a contour curve 1'; at least a part of the surface 1' comprises at least one or more irregularity 1' having a height difference between an adjacent peak and valley of 0.001 mm or more and 0.600 mm or less in the contour curve 1' in a predetermined direction; when a height difference and a width of the irregularity 1' are defined as H [mm] and W [mm], respectively, the following expression (1'):

$$H/W^2 \leq 1.5 \times 10^{-5} \tag{1'}$$

is satisfied.

* * * * *